(12) United States Patent
Zhang et al.

(10) Patent No.: US 12,118,642 B2
(45) Date of Patent: Oct. 15, 2024

(54) GRAPHICS RENDERING METHOD AND APPARATUS

(71) Applicant: HUAWEI TECHNOLOGIES CO., LTD., Guangdong (CN)

(72) Inventors: Pan Zhang, Hangzhou (CN); Liang Li, Beijing (CN); Wei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 17/516,479

(22) Filed: Nov. 1, 2021

(65) Prior Publication Data

US 2022/0058766 A1   Feb. 24, 2022

Related U.S. Application Data

(63) Continuation of application No. PCT/CN2020/083772, filed on Apr. 8, 2020.

(30) Foreign Application Priority Data

Apr. 30, 2019 (CN) .......................... 201910364218.8

(51) Int. Cl.
   *G06T 1/20* (2006.01)
   *G06T 1/60* (2006.01)

(52) U.S. Cl.
   CPC . *G06T 1/20* (2013.01); *G06T 1/60* (2013.01)

(58) Field of Classification Search
   None
   See application file for complete search history.

(56) References Cited

U.S. PATENT DOCUMENTS

| | | | |
|---|---|---|---|
| 7,173,627 B2 | 2/2007 | Doyle et al. | |
| 11,089,081 B1* | 8/2021 | Karppanen | ............. H04L 67/01 |
| 11,804,931 B2* | 10/2023 | Huang | ................... H04L 1/1887 |
| 2002/0062389 A1* | 5/2002 | Vertes | ........................ G06F 9/54 |
| | | | 712/208 |
| 2003/0001848 A1 | 1/2003 | Doyle et al. | |
| 2009/0100483 A1 | 4/2009 | McDowell | |
| 2010/0131669 A1* | 5/2010 | Srinivas | ................... G06F 9/452 |
| | | | 709/233 |
| 2017/0091160 A1 | 3/2017 | Lee et al. | |
| 2019/0205147 A1* | 7/2019 | Huang | ................... G06F 3/1454 |
| 2020/0076846 A1* | 3/2020 | Pandian | .............. H04L 63/1425 |

(Continued)

FOREIGN PATENT DOCUMENTS

| | | |
|---|---|---|
| CN | 1639686 A | 7/2005 |
| CN | 1324473 C | 7/2007 |

(Continued)

*Primary Examiner* — Michael J Cobb
(74) *Attorney, Agent, or Firm* — Gregg Jansen

(57) ABSTRACT

This application provides a graphics rendering method and apparatus. A service starts an application and obtains a rendering instruction sent by the application; and sends the rendering instruction to an electronic device. The electronic device performs graphics rendering according to the rendering instruction, to display an image related to the application. According to the technical solutions provided in this application, the electronic device, instead of the server, can perform graphics rendering according to the rendering instruction, thereby improving picture quality and user experience.

18 Claims, 9 Drawing Sheets

(56) References Cited

U.S. PATENT DOCUMENTS

| | | | |
|---|---|---|---|
| 2024/0049331 A1* | 2/2024 | Jiang | H04L 1/1812 |
| 2024/0073764 A1* | 2/2024 | Park | H04W 76/27 |

FOREIGN PATENT DOCUMENTS

| | | | |
|---|---|---|---|
| CN | 103023872 A | 4/2013 | |
| CN | 104796393 A | 7/2015 | |
| CN | 105727556 A | 7/2016 | |
| CN | 105850097 A | 8/2016 | |
| CN | 107483382 A | 12/2017 | |
| CN | 107977272 A | 5/2018 | |
| CN | 109358936 A | 2/2019 | |
| EP | 1399816 A2 | 3/2004 | |
| WO | 03003206 A2 | 1/2003 | |
| WO | 2013028202 A1 | 2/2013 | |
| WO | 2018077041 A1 | 5/2018 | |

* cited by examiner

GRAPHICS RENDERING METHOD AND APPARATUS

CROSS-REFERENCE TO RELATED APPLICATIONS

This application is a continuation of International Application No. PCT/CN2020/083772, filed on Apr. 8, 2020, which claims priority to Chinese Patent Application No. 201910364218.8, filed on Apr. 30, 2019. The disclosures of the aforementioned applications are hereby incorporated by reference in their entireties.

TECHNICAL FIELD

This application relates to the field of information technologies, and in particular, to a graphics rendering method and apparatus.

BACKGROUND

In a conventional mode, a mobile phone application (APP) is run on an electronic device, and the APP can be used only after the electronic device performs an operation such as downloading or updating. If a size of the APP is large, a problem exists that a download time is long and large storage space of the electronic device is occupied. In addition, function redundancy/size expansion of the APP is a current trend, and this problem is increasingly inevitable. If the APP is a game APP, the game APP is installed locally on the electronic device. A variety of cheating programs emerge one after another, and it is difficult to fundamentally prohibit the cheating program, which affects game fairness and experience. Therefore, it is proposed that a logical running environment of an APP in the electronic device is separated from a rendering environment of the APP, that is, the APP is run on a cloud side (for example, a server), and a rendering instruction is redirected to a device side (for example, the electronic device). A cloud phone/cloud game running mode in which a cloud phone and a cloud game are separated is also referred to as so-called separation and rendering, i.e. remote rendering (RR).

Based on a separation and rendering technology, a video stream separation and rendering solution is proposed in the conventional technology. A graphics processing unit (GPU) on the cloud side may perform graphics rendering, to generate a video stream, encode the video stream, and send the video stream to the electronic device. The electronic device only needs to have a video decoding capability. However, for the existing video stream separation and rendering solution, an image generated through graphics rendering performed by the GPU on the cloud side is compressed, to reduce bandwidth used for transmitting the video stream from the cloud side to the device side. Consequently, picture quality of the image is relatively poor, and user experience is relatively poor.

SUMMARY

This application provides a graphics rendering method, a server, and an electronic device. The electronic device performs graphics rendering according to an obtained rendering instruction, to obtain an image that has a same rendering effect as an application, thereby improving picture quality and user experience.

According to a first aspect, a graphics rendering method is provided, and the method is applied to a server. The method includes: starting an application; obtaining a rendering instruction sent by the application; and sending the rendering instruction to an electronic device through a network. The rendering instruction is used by the electronic device to perform graphics rendering, so that an image related to the application, for example, a program picture or a configuration interface of the application, is displayed on the electronic device. A game application is used as an example. The electronic device executes the rendering instruction on a GPU, to display a game picture or the like on a display device of the electronic device.

In this application, separation and rendering may be implemented by using an instruction stream solution. The server may obtain rendering instructions sent (or generated) by the application, and send the rendering instructions to the electronic device connected to the server. The electronic device that receives the rendering instructions performs graphics rendering, thereby avoiding a phenomenon that in a video stream separation and rendering solution, the server performs graphics rendering, to generate a video stream adapted to a fixed screen size, and if a size of a picture rendered by the electronic device does not match a size of a picture rendered by the server, an image is stretched or compressed. In the technical solution of this application, the server may send, to the electronic device, a rendering instruction stream used for the graphics rendering. On one hand, load of a graphics processing unit (GPU) of the server can be reduced. On the other hand, the rendering instruction is sent to the electronic device, and the electronic device performs graphics rendering on a device side according to the rendering instruction. This can better adapt to a screen size of the electronic device, and improve picture quality and user experience.

In some implementations, the starting an application may include: The server starts the application in response to a first instruction. The first instruction may be sent by the electronic device to the server, may be from another device, or may be generated by the server.

The rendering instruction may include rendering information required by a rendering context, and the rendering information may include status information and data information. For example, the data information may be a plurality of pieces of vertex data, and the status information may be vertex data bound to a current rendering context.

According to a second aspect, this application further provides a resumable transmission method. The method should be applied to the foregoing instruction stream separation and rendering solution, and can achieve a same or better resumable transfer effect as the video stream separation and rendering solution. The method includes: A server stores graphics rendering information, where the graphics rendering information is information required by the electronic device to perform graphics rendering; and sends the graphics rendering information to the electronic device when needed, so that the electronic device performs graphics rendering based on the graphics rendering information. After the electronic device is disconnected (which may be due to a network fault or a device fault) and then reconnected, the server receives a second instruction sent by the electronic device. The second instruction is used to request to restore a connection to the server. The server sends the graphics rendering information to the electronic device in response to the second instruction. The graphics rendering information is used by the electronic device to perform graphics rendering.

In some implementations, the graphics rendering information may include a rendering instruction. In some other implementations, the graphics rendering information may include the rendering instruction and/or a variable of other information.

In some implementations, the server stores the graphics rendering information in response to the second instruction sent by the electronic device. In other words, the graphics rendering information stored in the server is only graphics rendering information that is generated when the electronic device requests to restore the connection to the server (and in a period of time after that). For the electronic device, the information is usually information that is used by the electronic device to restore to a latest running state of the application. In this way, it is more effective to store the graphics rendering information, and a storage space occupation rate can also be reduced. In some other implementations, the server may also store the graphics rendering information at any time, or store the graphics rendering information according to another rule.

In some implementations, the graphics rendering information is information used by the electronic device to restore a current latest rendering context of the application. The current latest rendering context may be a rendering context of the application when the server receives the second instruction.

For example, the application is a parkour game, and the parkour game is run in the server (in a form similar to a cloud game), but can be played on an electronic device of a user. After the electronic device is disconnected from the server, the user cannot enter a game interface, but the game is still run on the server. When the electronic device sends, to the server, the second instruction for requesting to restore the connection, the server sends the rendering information stored in the server to the electronic device, so that the electronic device restores to a current latest game interface of the parkour game, and the user may continue to play the game from the current latest game interface. This is similar to resumable transfer in the video stream solution.

For another example, the application is enterprise WeChat, and the enterprise WeChat is run on the server. The user obtains, by using the electronic device, a message sent by the enterprise WeChat. After the electronic device is disconnected from the server, the electronic device cannot receive the message. After the electronic device is reconnected to the server, a message interface that includes a latest message sent by the enterprise WeChat may be directly rendered and displayed by using the method provided in this application.

For the video stream separation and rendering solution, because a video stream has a resumable transmission feature, when the server is disconnected from the electronic device and is reconnected, the server may continue to send the video stream to the electronic device, to implement reconnection upon disconnection. However, for the instruction stream separation and rendering solution, because a dependency exists between rendering contexts used for the graphics rendering, the rendering contexts do not have the resumable transmission feature. Therefore, in this application, the graphics rendering information may be stored in the server. After the server receives the instruction that is sent by the electronic device and that is used to request to restore the connection to the server, the server may send the stored graphics rendering information to the electronic device, so that the electronic device has the rendering information required for restoring the rendering context. This implements the reconnection upon disconnection between the server and the electronic device.

In some implementations, the graphics rendering information may be stored in the server on which the application is run, or may be stored in another server or another type of device. Alternatively, the graphics rendering information may be stored in a plurality of devices in a distributed manner or stored in another device in a remote storage manner.

In some implementations, the graphics rendering information is the rendering instruction. In some embodiments of this application, the server may intercept a rendering instruction sent by the application, and copy the rendering instruction. One copy of the rendering instruction is sent to the electronic device, and the other copy of the rendering instruction is stored in the server.

In some implementations, the graphics rendering information is a rendering information set, and the rendering information set is used by the electronic device to restore the rendering context of the application. In some embodiments of this application, the server may process the intercepted rendering instruction, to store a minimum set of information required by the electronic device to restore the rendering context of the application, thereby saving storage space.

It should be understood that the rendering information set may be minimum rendering information required by the electronic device to restore the rendering context of the application. For example, it is assumed that the rendering instruction may include 100 pieces of vertex data, the electronic device may perform graphics rendering based on 80 pieces of vertex data in the 100 pieces of vertex data, to construct a graph. In this case, the 80 pieces of vertex data that are in the 100 pieces of vertex data and that are required for constructing the graph may be the minimum rendering information. If 81 pieces of vertex data are sent to the electronic device, redundant information exists. If 79 pieces of vertex data are sent to the electronic device, the electronic device cannot construct the graph. The foregoing descriptions are examples, and do not constitute any limitation on this application.

In some implementations, the method further includes: determining the rendering information set according to a preconfigured information list and the rendering instruction. The preconfigured information list includes rendering information required for restoring the connection between the electronic device and the server. For example, the preconfigured information list includes rendering information whose quantity of retransmission times is less than a predetermined threshold.

It should be understood that the preconfigured information list may be a minimum set or an optimal set of the rendering context. Redundancy of stored data is caused by excessively more information in the preconfigured information list. The rendering context cannot be restored with excessively less data, and graphics rendering cannot be performed.

Optionally, the preconfigured information list may include rendering information that is not retransmitted/reset in an N-frame (N may be set) graph. For example, the preconfigured information list may be obtained by analyzing several engines and typical APPs that currently occupy an overwhelming majority of markets. The preconfigured information list is obtained by continuously capturing, repeatedly comparing, and analyzing a change of the rendering instruction and a change of the rendering context in cases such as a scenario change, a touch feedback, no input, and the like. The information list may include data or a status that is not retransmitted/reset in the N-frame (N may be set) graph.

In this embodiment of this application, the minimum rendering information required by the electronic device to restore the rendering context of the application may be determined according to the obtained rendering instruction and the preconfigured information list. In other words, the rendering information set is determined, so that the rendering information set is stored. When the electronic device is reconnected to the server, the rendering information set is sent to the electronic device, so that the electronic device restores the graphics rendering when the electronic device is disconnected from the server.

In this embodiment of this application, to reduce a waiting time required for the reconnection upon disconnection, the server may send the rendering information set to the electronic device. The rendering information set may be the minimum set of the information required by the electronic device to restore the rendering context of the application.

In some implementations, the method further includes: reordering rendering information in the rendering information set according to a rendering order, where the rendering order is an order of rendering information when a rendering pipeline of the electronic device runs graphics rendering. The sending the graphics rendering information to the electronic device includes: sending the reordered rendering information set to the electronic device.

In this embodiment of this application, the rendering information in the rendering information set may be ordered. The rendering information set may be ordered according to the order of the rendering information when the rendering pipeline of the electronic device runs graphics rendering, and the reordered rendering information set is sent to the electronic device. Therefore, it can be ensured that the electronic device does not need to care about the order of the rendering information when performing graphics rendering, thereby simplifying graphics rendering on the electronic device side.

In some implementations, the server may send all of the graphics rendering information to the electronic device. Alternatively, the server may send some information of the graphics rendering information to the electronic device, determine missing rendering information of the electronic device based on a requirement of the electronic device, for example, a cache list of the electronic device, and then continue to send the missing rendering information to the electronic device, that is, implement on-demand sending. Alternatively, the server may send missing rendering information to the electronic device from the beginning based on a requirement of the electronic device.

In some implementations, the method further includes: receiving a cache list sent by the electronic device, where the cache list is a list of rendering information cached by the electronic device. The sending the graphics rendering information to the electronic device includes: sending some or all of the graphics rendering information to the electronic device according to the cache list, where the sent graphics rendering information is graphics rendering information that does not exist in the cache list. The server determines the missing rendering information of the electronic device according to one or more of rendering instructions, and searches the cache list for the missing rendering information. If the missing rendering information exists in the cache list, the server sends a third instruction to the electronic device, where the third instruction is used to instruct the electronic device to obtain the missing rendering information from a local cache. Alternatively, if the missing rendering information does not exist in the cache list, the server sends the missing rendering information to the electronic device, where the rendering information set includes the missing rendering information.

An OpenGL ES is used as an example. The rendering instruction obtained by the server includes a draw call, and the draw call may further include the following instructions (which are merely examples and are not limited to the following instructions):

glDrawArrays, glDrawElements, glDrawArraysInstanced, glDrawElementsInstancedg, lDrawRangeElements, glDrawArraysIndirect, and glDrawElementsIndirect.

For another example, the OpenGL ES is used as an example. The rendering instruction obtained by the server includes a key instruction, and the key instruction may include but is not limited to the following instructions:

glBindBuffer, glBufferData, glBufferSubData, glBindTexture, glTexImage2D, glTexSubImage2D, glTexImage3D, glTexSubImage3, glCompressedTexImage2D, glCompressedTexSubImage2D, glCompressedTexImage3D, and glCompressedTexSubImage3D. In this application, the server may obtain the cache list of the electronic device, monitor the draw call instruction or the key instruction, determine the missing rendering information of the electronic device according to the monitored rendering instruction, and search the cache list for the missing rendering information. When the missing rendering information does not exist in the cache list of the electronic device, the server sends the missing rendering information to the electronic device. This accelerates a process of restoring the rendering context by the electronic device, and shortens the waiting time for the reconnection upon disconnection between the server and the electronic device.

In some implementations, the sending the graphics rendering information to the electronic device includes: determining an instruction sequence, where the instruction sequence is used by a graphics processing unit of the electronic device to identify the rendering information set; and sending the instruction sequence and the rendering information set to the electronic device.

In this embodiment of this application, to ensure that the electronic device restores the rendering context, it needs to be first ensured that the electronic device can identify the rendering information set, and the instruction sequence can be further determined. The instruction sequence is used by the graphics processing unit of the electronic device to identify the rendering information set.

In some implementations, different instruction sequences may be constructed based on status information in the rendering information. For example, if the status information is linked (linked), a constructed instruction sequence may include instructions such as a creation instruction, a compilation instruction, and a mounting instruction. If the status information is not linked, a constructed instruction sequence may include a remounting instruction.

According to a third aspect, a graphics rendering method is provided, and the method is applied to an electronic device. The method includes: receiving a rendering instruction sent by a server, where the rendering instruction is used by the electronic device to perform graphics rendering; and performing graphics rendering according to the rendering instruction, to display an image related to the application. Compared with a video stream cloud application solution, in this solution, the server sends the rendering instruction, and then performs graphics rendering on the electronic device side, to display an interface related to the application, and the like. For beneficial effects, refer to the foregoing description.

In some implementations, the method further includes: sending a first instruction to the server, where the first instruction is used to instruct the server to run the application.

The rendering instruction may include a rendering context used for the graphics rendering. The rendering context may be a resource set required for the graphics rendering. The resource set may include status information and data information. For example, the data information may be a plurality of pieces of vertex data, and the status information may be vertex data bound to a current rendering context.

In this application, separation and rendering may be implemented by using an instruction stream solution. The server may obtain the rendering instruction sent by the application, and send the rendering instruction to an electronic device connected to the server. The electronic device that receives the rendering instruction performs graphics rendering, thereby avoiding a phenomenon that in a video stream separation and rendering solution, the server performs graphics rendering, to generate a video stream adapted to a fixed screen size, and if a size of a picture rendered by the electronic device does not match a size of a picture rendered by the server, an image is stretched or compressed. In the technical solution of this application, the server may send, to the electronic device, a rendering instruction stream used for the graphics rendering. On one hand, load of a graphics processing unit of the server can be reduced. On the other hand, the rendering instruction is sent to the electronic device, and the electronic device performs graphics rendering on a device side according to the rendering instruction. This can better adapt to a screen size of the electronic device, and improve picture quality and user experience.

In some implementations, the method further includes: sending a second instruction to the server, where the second instruction is used to request to restore a connection between the electronic device and the server; and receiving graphics rendering information sent by the server, where the graphics rendering information is information that is stored by the server and that is required by the electronic device to perform graphics rendering.

It should be noted that, for the video stream separation and rendering solution, because a video stream has a resumable transmission feature, when the server is disconnected from the electronic device and is reconnected, the server may continue to send the video stream to the electronic device, to implement reconnection upon disconnection. However, for the instruction stream separation and rendering solution, because a dependency exists between rendering contexts used for the graphics rendering, the rendering contexts do not have the resumable transmission feature.

Therefore, in this application, the graphics rendering information may be stored in the server. After the server receives the instruction that is sent by the electronic device and that is used to request to restore the connection to the server, the server may send the stored graphics rendering information to the electronic device, so that the electronic device has the rendering information required for restoring the rendering context. This implements the reconnection upon disconnection between the server and the electronic device.

In some implementations, the graphics rendering information is the rendering instruction.

In this application, the server may intercept a rendering instruction sent by the application, and copy the rendering instruction. One copy of the rendering instruction may be sent to the electronic device, and the other copy of the rendering instruction may be stored in the server.

In some implementations, the graphics rendering information is a rendering information set, and the rendering information set is used by the electronic device to restore the rendering context of the application.

In this application, the server may process the intercepted rendering instruction, to store minimum rendering information required by the electronic device to restore the rendering context of the application. In other words, the server may store the rendering information set, thereby saving storage space in the server.

It should be understood that the rendering information set may be the minimum rendering information required by the electronic device to restore the rendering context of the application. For example, it is assumed that the rendering instruction may include 100 pieces of vertex data, the electronic device may perform graphics rendering based on 80 pieces of vertex data in the 100 pieces of vertex data, to construct a graph. In this case, the 80 pieces of vertex data that are in the 100 pieces of vertex data and that are required for constructing the graph may be the minimum rendering information. If 81 pieces of vertex data are sent to the electronic device, redundant information exists. If 79 pieces of vertex data are sent to the electronic device, the electronic device cannot construct the graph. The foregoing descriptions are examples, and do not constitute any limitation on this application.

In an implementation, the receiving graphics rendering information sent by the server includes: receiving the rendering information set sent by the server.

In this application, to reduce a waiting time required for the reconnection upon disconnection between the electronic device and the server, the server may send the rendering information set to the electronic device. The rendering information set may be the minimum rendering information required by the electronic device to restore the rendering context of the application.

In an implementation, the receiving the rendering information set sent by the server includes: receiving the reordered rendering information set. The reordered rendering information set is a rendering information set generated by reordering rendering information in the rendering information set according to a rendering order, and the rendering order is an order of rendering information when a rendering pipeline of the electronic device runs graphics rendering.

In this application, the rendering information in the rendering information set may be ordered. The rendering information set may be ordered according to the order of the rendering information when the rendering pipeline of the electronic device runs graphics rendering, and the reordered rendering information set is sent to the electronic device. Therefore, it can be ensured that the electronic device does not need to care about the order of the rendering information when performing graphics rendering, thereby simplifying graphics rendering.

In some implementations, the method further includes: determining an instruction sequence. The instruction sequence is used by a graphics processing unit of the electronic device to identify the rendering information set.

In this application, to ensure that the rendering context is restored, that is, to ensure that the electronic device can identify the rendering information set, the instruction sequence can be further determined. The instruction sequence is used by the graphics processing unit of the electronic device to identify the rendering information set.

In some implementations, the rendering information set includes first identification information and first rendering information. The first identification information is identification information used by the server to identify the first rendering information, and the method further includes:

determining a mapping relationship. The mapping relationship is a correspondence between the first identification information and second identification information, and the second identification information is identification information used by the electronic device to identify the first rendering information.

For example, the electronic device receives the rendering information set sent by the server. The rendering information set includes the first rendering information, and the first rendering information includes an identifier set by the server, for example, the identifier is #5. The GPU of the electronic device performs graphics rendering based on the first rendering information, and feeds back an identifier, for example, an identifier #4, to the electronic device. In this case, the electronic device may determine the mapping relationship, namely, a correspondence between #5 of the server and #4 of the electronic device.

According to a fourth aspect, a graphics rendering method is provided, including: receiving a fourth instruction sent by an electronic device, where the fourth instruction is used to instruct the electronic device to disconnect from a server; obtaining a rendering instruction sent by the application, where the rendering instruction is used by the server to perform graphics rendering; receiving a second instruction sent by the electronic device, where the second instruction is used to request to restore a connection between the electronic device and the server; storing graphics rendering information, where the graphics rendering information is used to restore a rendering context, and the rendering context is a rendering context of the application when the second instruction is received; performing graphics rendering based on the graphics rendering information, to generate a video stream; and sending the video stream to the electronic device.

It should be understood that in this embodiment of this application, the server may perform on-demand rendering based on a status of the connection between the electronic device and the server. If the electronic device and the server are in a connected state, a graphics processing unit of the server performs graphics rendering according to the rendering instruction, to generate the video stream. If the electronic device and the server are in an offline state, the graphics processing unit of the server does not perform graphics rendering.

In this application, after the electronic device is disconnected from the server, the server may not perform graphics rendering, and may store the graphics rendering information in the server. After the server receives an instruction that is sent by the electronic device and that is used to request to restore the connection to the server, the server may perform graphics rendering based on the graphics rendering information, to generate the video stream, and send the video stream to the electronic device. In this way, the on-demand graphics rendering is implemented between the server and the electronic device, thereby reducing load of the server.

In some implementations, the graphics rendering information is the rendering instruction.

In this application, the server may intercept a rendering instruction sent by the application, and copy the rendering instruction. One copy of the rendering instruction may be sent to the electronic device, and the other copy of the rendering instruction may be stored in the server.

In some implementations, the graphics rendering information is the rendering information set, and the graphics rendering information is a rendering information set obtained by processing the rendering instruction.

In this application, the server may store the rendering information set. In other words, the server may store minimum rendering information used by the electronic device to restore the rendering context of the application, thereby saving storage space in the server.

In some implementations, the method further includes: determining the rendering information set according to a preconfigured information list and the rendering instruction. The preconfigured information list includes rendering information whose quantity of retransmission times is less than a predetermined threshold.

It should be understood that the preconfigured information list may be a minimum set or an optimal set of the rendering context. Redundancy of stored data is caused by excessively more information in the preconfigured information list. The rendering context cannot be restored with excessively less data, and graphics rendering cannot be performed.

Optionally, the preconfigured information list may include rendering information that is not retransmitted/reset in an N-frame (N may be set) graph.

For example, the preconfigured information list may be obtained by analyzing several engines and typical APPs that currently occupy an overwhelming majority of markets. The preconfigured information list is obtained by continuously capturing, repeatedly comparing, and analyzing a change of the rendering instruction and a change of the rendering context in cases such as a scenario change, a touch feedback, no input, and the like. The information list may include data or a status that is not retransmitted/reset in the N-frame (N may be set) graph.

In this application, the minimum rendering information, namely, the rendering information set, used by the electronic device to restore the rendering context of the application may be determined according to the obtained rendering instruction and the preconfigured information list, so that the rendering information set is stored in the server.

In some implementations, the method further includes: determining an instruction sequence. The instruction sequence is used by the graphics processing unit of the server to identify the rendering information set.

In this application, to ensure that the rendering context is restored, that is, to ensure that the graphics processing unit of the server can identify the rendering information set and perform rendering, to generate the video stream, the instruction sequence can be further determined. The instruction sequence is used by the graphics processing unit of the server to identify the rendering information set.

According to a fifth aspect, a graphics rendering apparatus is provided. The apparatus includes a module corresponding to the method/operation/step/action according to the first aspect.

The foregoing apparatus may be a server, or may be an apparatus (for example, a chip, or an apparatus that can work together with a server) that is in the server and that is configured to perform graphics rendering.

The module included in the foregoing graphics rendering apparatus may be a hardware circuit, may be software, or may be implemented by a combination of a hardware circuit and software.

According to a sixth aspect, a graphics rendering apparatus is provided. The apparatus includes a module corresponding to the method/operation/step/action according to the second aspect.

The foregoing apparatus may be a server, or may be an apparatus (for example, a chip, or an apparatus that can work together with a server) that is in the server and that is configured to perform graphics rendering.

The module included in the foregoing graphics rendering apparatus may be a hardware circuit, may be software, or may be implemented by a combination of a hardware circuit and software.

According to a seventh aspect, a graphics rendering apparatus is provided. The apparatus includes a module corresponding to the method/operation/step/action according to the third aspect.

The foregoing apparatus may be an electronic device, or may be an apparatus (for example, a chip, or an apparatus that can work together with an electronic device) that is in the electronic device and that is configured to perform graphics rendering.

The module included in the foregoing graphics rendering apparatus may be a hardware circuit, may be software, or may be implemented by a combination of a hardware circuit and software.

According to an eighth aspect, a graphics rendering apparatus is provided. The apparatus includes a module corresponding to the method/operation/step/action according to the fourth aspect.

The foregoing apparatus may be a server, or may be an apparatus (for example, a chip, or an apparatus that can work together with a server) that is in the server and that is configured to perform graphics rendering.

The module included in the foregoing graphics rendering apparatus may be a hardware circuit, may be software, or may be implemented by a combination of a hardware circuit and software.

According to a ninth aspect, a graphics rendering apparatus is provided. The apparatus includes a processor, and the processor is configured to invoke program code stored in a memory, to perform some or all operations in any manner according to the first aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device).

Optionally, the memory is a non-volatile memory.

When the graphics rendering apparatus includes the processor and the memory, the processor and the memory may be coupled together.

According to a tenth aspect, a graphics rendering apparatus is provided. The apparatus includes a processor, and the processor is configured to invoke program code stored in a memory, to perform some or all operations in any manner according to the second aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device).

Optionally, the memory is a non-volatile memory.

When the graphics rendering apparatus includes the processor and the memory, the processor and the memory may be coupled together.

According to an eleventh aspect, a graphics rendering apparatus is provided. The apparatus includes a processor, and the processor is configured to invoke program code stored in a memory, to perform some or all operations in any manner according to the third aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device).

Optionally, the memory is a non-volatile memory.

When the graphics rendering apparatus includes the processor and the memory, the processor and the memory may be coupled together.

According to a twelfth aspect, a graphics rendering apparatus is provided. The apparatus includes a processor, and the processor is configured to invoke program code stored in a memory, to perform some or all operations in any manner according to the fourth aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device).

Optionally, the memory is a non-volatile memory.

When the graphics rendering apparatus includes the processor and the memory, the processor and the memory may be coupled together.

According to a thirteenth aspect, a computer-readable storage medium is provided. The computer-readable storage medium stores program code, and the program code includes instructions used to perform some or all operations in the method according to any one of the foregoing aspects.

Optionally, the computer-readable storage medium is located inside an electronic device, and the electronic device may be an apparatus that can perform graphics rendering.

According to a fourteenth aspect, an embodiment of this application provides a computer program product. When the computer program product is run on a communications apparatus, the communications apparatus performs some or all of operations in the method according to any one of the foregoing aspects.

According to a fifteenth aspect, a chip is provided. The chip includes a processor, and the processor is configured to perform some or all of operations in the method according to any one of the foregoing aspects.

According to a sixteenth aspect, a system is provided, including the foregoing electronic device and the foregoing server.

DESCRIPTION OF EMBODIMENTS

The following describes technical solutions of this application with reference to accompanying drawings.

In embodiments of this application, a graphics rendering method may be performed by an electronic device. The electronic device may be a mobile terminal (for example, a smartphone), a computer, a personal digital assistant, a wearable device, a vehicle-mounted device, an internet of things device, or another device that can perform graphics rendering processing. The electronic device may be a device that runs an Android system, an iOS system, a Windows system, or another system.

According to the graphics rendering method in this embodiment of this application, an instruction stream separation and rendering solution may be implemented. The instruction stream separation and rendering solution means that a rendering instruction sent by an APP may be intercepted on a cloud side (for example, a server). The rendering instruction is used by the electronic device to perform graphics rendering. The rendering instruction may include rendering information required by a rendering context, and the rendering information may include status information and data information. For example, the data information may be a plurality of pieces of vertex data, and the status information may be vertex data bound to a current rendering context.

Figure 1:
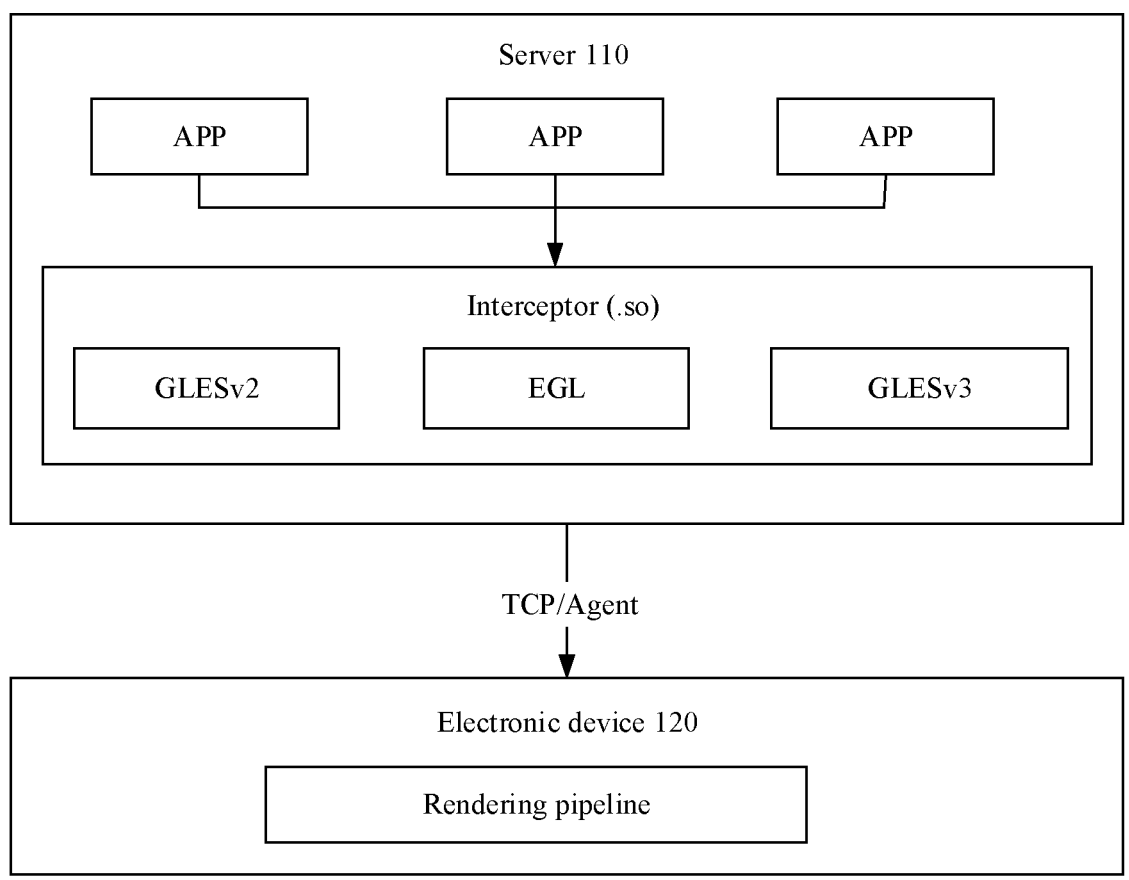
FIG. 1 is a diagram of a system architecture for graphics rendering according to an embodiment of this application.

The graphics rendering method in this embodiment of this application may be applied to a system architecture shown in FIG. 1.

As shown in FIG. 1, the system architecture may include a server 110 and an electronic device 120. The server 110 may include one or more applications APP. The server 110 further includes an interceptor. The interceptor may be configured to: intercept a rendering instruction sent by the APP, and redirect the rendering instruction to an electronic device by using a network transmission control protocol (TCP) or an agent. After the electronic device receives the rendering instruction, a rendering pipeline of the electronic device may establish and maintain a rendering context, and perform a graphics rendering operation. The interceptor may run, on the server, a segment of program used to obtain the rendering instruction sent by the APP. For example, the rendering instruction obtained by the interceptor may be an OpenGL ES 2.0, an OpenGL ES 3.0, or an EGL.

It should be understood that, in the instruction stream separation and rendering solution shown in FIG. 1, when the electronic device is connected to the server, graphics rendering may be performed on a GPU of the electronic device. The rendering instruction used for the graphics rendering may be redirected to the electronic device, so that the GPU of the electronic device may perform graphics rendering according to the rendering instruction. For example, a graph that is adapted to a screen size of the electronic device may be generated according to the rendering instruction, so that definition of the graph and user experience can be improved.

In a video stream separation and rendering solution, a GPU of the server may obtain the rendering instruction sent by the application, and perform graphics rendering, to generate a video stream. Because no state dependency exists between images in the video stream, reconnection upon disconnection may be implemented between the electronic device and the server. When the electronic device and the server are switched from an offline state to a connected state, the electronic device may continue to obtain the video stream sent by the server, to implement connection upon disconnection with the server. However, for the instruction stream separation and rendering solution, when the electronic device is disconnected from the server, the electronic device cannot continue to receive the rendering instruction sent by the server. Because the electronic device lacks some rendering information required for the graphics rendering and a state dependency exists in the rendering information, the electronic device cannot continue to perform graphics rendering. To implement reconnection upon disconnection between the electronic device and the server in the instruction stream separation and rendering solution, a system architecture shown in FIG. 2 may be used.

Figure 2:
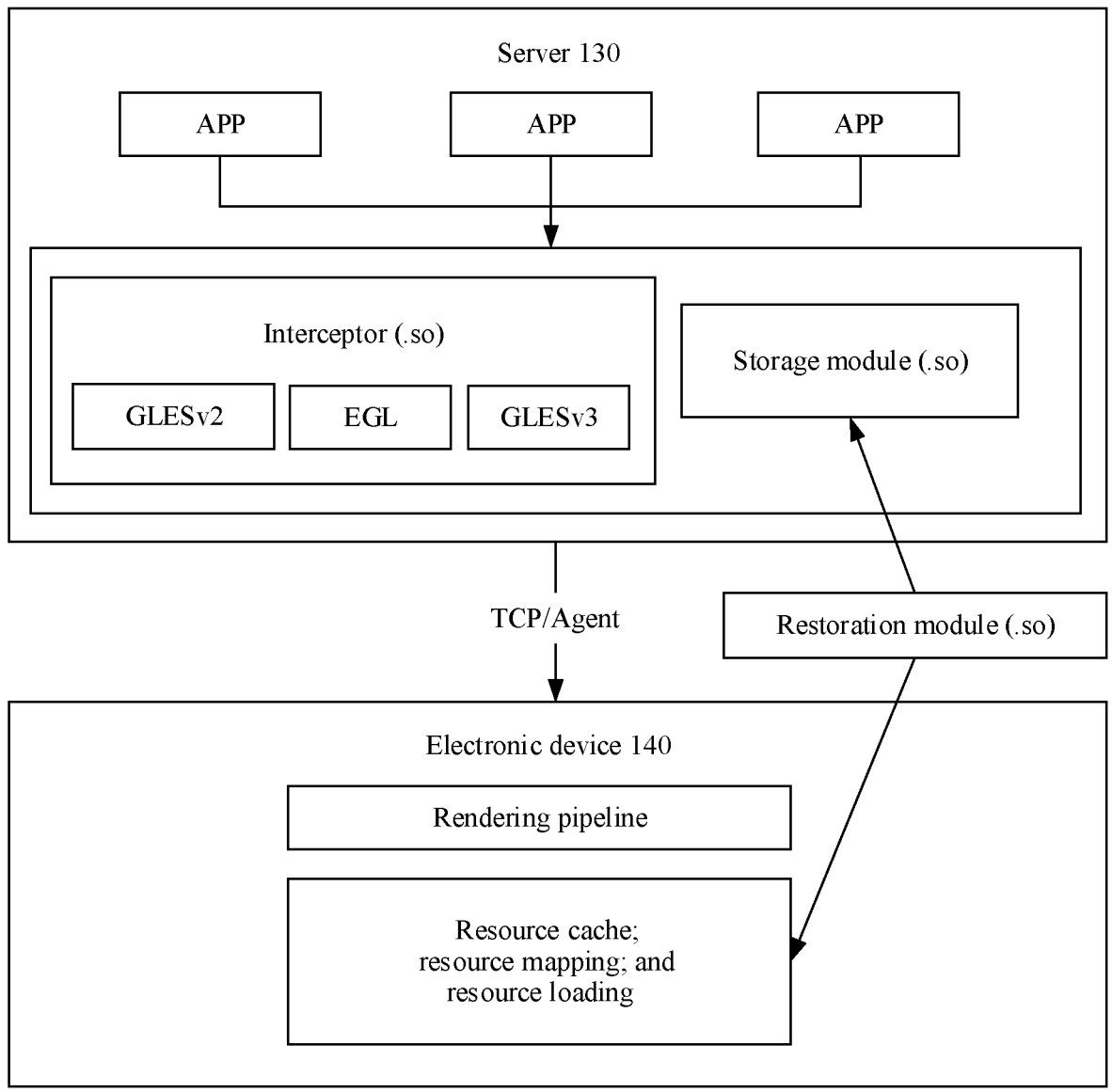
FIG. 2 is a diagram of a system architecture for graphics rendering according to another embodiment of this application.

As shown in FIG. 2, a storage module and a restoration module may be disposed in the system architecture. The storage module may be located in the server and may be used by any APP. All rendering instructions intercepted by the interceptor may be sent to the electronic device, and the rendering instructions may be copied and stored in the storage module. In addition, the storage module may further generate a snapshot. The snapshot is a copy of an information set that is used by the electronic device to restore the rendering context. The restoration module may be located in the server, or may be located in the electronic device. The restoration module is used by the electronic device to reestablish the rendering context.

Figure 3:
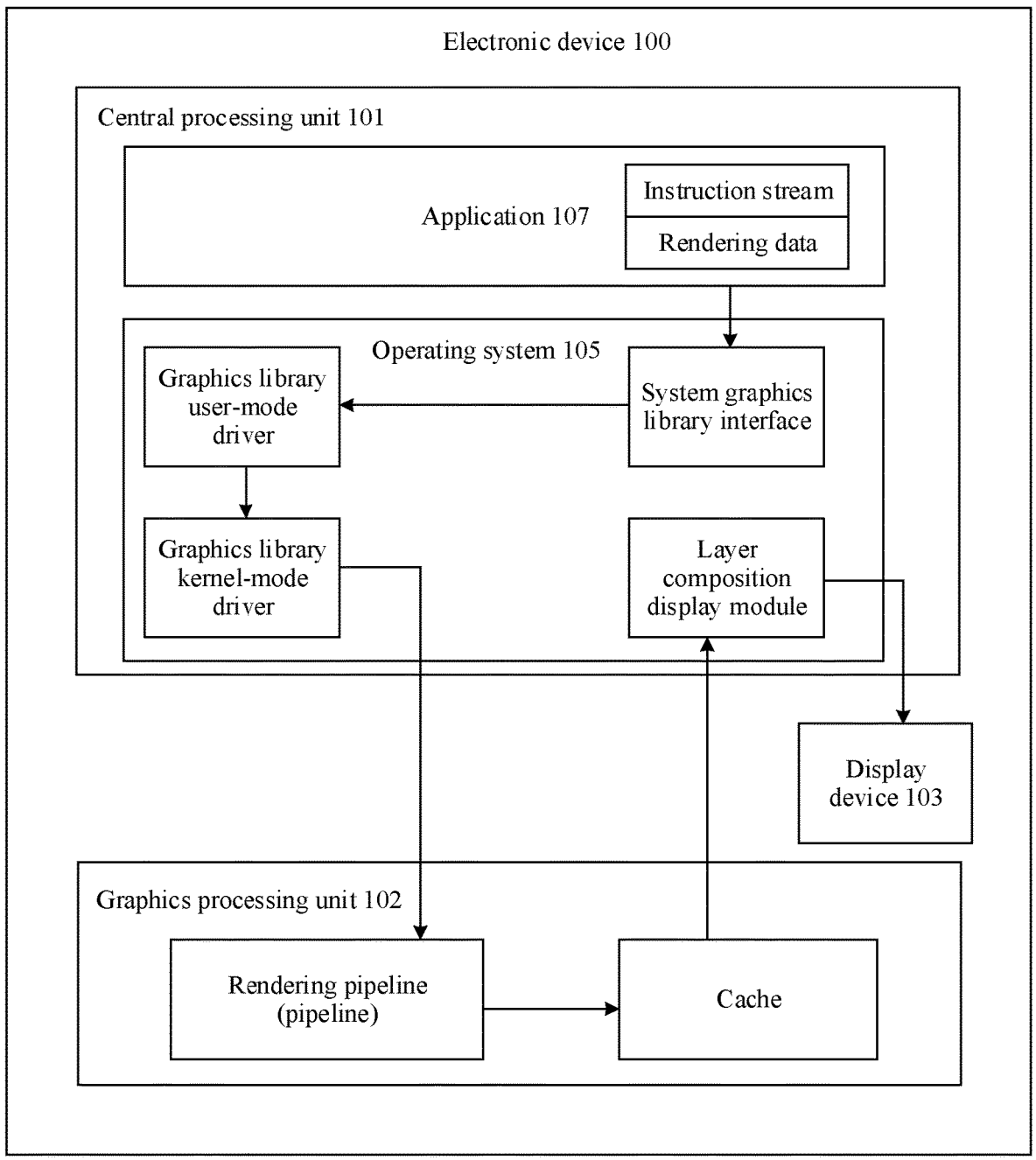
FIG. 3 is a flowchart of performing graphics rendering by an electronic device according to an obtained rendering instruction according to this application.

The following describes a specific structure of the electronic device in detail with reference to FIG. 3. The electronic device shown in FIG. 3 may be the electronic device 110 in the system architecture shown in FIG. 1, or may be an electronic device 140 in the system architecture shown in FIG. 2.

In an embodiment, as shown in FIG. 3, the electronic device 100 may include a central processing unit (CPU) 101, a graphics processing unit (GPU) 102, a display device 103, and a memory 104. Optionally, the electronic device 100 may further include at least one communications bus 110 (not shown in FIG. 3) that is used to implement connection and communication between components.

It should be understood that the components in the electronic device 100 may alternatively be coupled to each other through another connector, and the another connector may include various interfaces, transmission lines, buses, or the like. The components in the electronic device 100 may alternatively be connected in a radial manner using the processor 101 as a center. In the embodiments of this application, coupling means mutual electrical connection, including direct connection or indirect connection through another device.

The central processing unit 101 and the graphics processing unit 102 may also be connected in a plurality of manners, which are not limited to the manner shown in FIG. 3. The central processing unit 101 and the graphics processing unit 102 in the electronic device 100 may be located on a same chip, or may be independent chips.

The following briefly describes functions of the central processing unit 101, the graphics processing unit 102, and the display device 103.

The central processing unit 101 is configured to run an operating system 105 and an application 107. The application 107 may be an application of a graphics type, for example, a game or a video player. The operating system 105 provides a system graphics library interface. The application 107 may receive, through the system graphics library interface, an instruction stream (for example, the rendering instruction) that is sent by the server and that is used to render a graphic or image frame. A driver, for example, a graphics library user-mode driver and/or a graphics library kernel-mode driver, provided by the operating system 105, generates an instruction stream that can be identified by a rendering pipeline of the graphics processing unit 102 and required related rendering data. The system graphics library interface includes but is not limited to system graphic libraries such as an open graphics library for embedded system (open graphics library for embedded system, OpenGL ES), the khronos platform graphics interface (the khronos platform graphics interface), or Vulkan (a cross-platform drawing application interface). The instruction stream includes a series of instructions, and the instructions are usually instructions for invoking the system graphics library interface.

Optionally, the central processing unit 101 may include at least one of the following types of processors: an application processor, one or more microprocessors, a digital signal processor (DSP), a microcontroller unit (MCU), an artificial intelligence processor, or the like.

The central processing unit 101 may further include a necessary hardware accelerator, for example, an application-specific integrated circuit (ASIC), a field programmable gate array (FPGA), or an integrated circuit configured to implement a logical operation. The processor 101 may be coupled to one or more data buses, and is configured to transmit data and an instruction between components in the electronic device 100.

The graphics processing unit 102 is configured to receive a graphics instruction stream sent by the processor 101, generate a rendering target by using the rendering pipeline, and display the rendering target on the display device 103 using a layer composition display module of the operating system.

Optionally, the graphics processing unit 102 may include a general-purpose graphics processing unit that executes software, for example, the GPU or another type of special-purpose graphics processing unit.

The display device 103 is configured to display various images generated by the electronic device 100. The image may be a graphical user interface (GUI) of the operating system or image data (including a still image and video data) processed by the graphics processing unit 102.

Optionally, the display device 103 may include any suitable type of display screen, for example, a liquid crystal display (LCD), a plasma display, or an organic light-emitting diode (OLED) display.

The rendering pipeline is a series of operations sequentially performed by the graphics processing unit 102 in a process of rendering a graphic or image frame. Typical operations include vertex processing, primitive processing, rasterization, fragment processing, and the like.

The foregoing describes the system architecture to which the embodiments of this application are applicable and a procedure of performing graphics rendering inside the electronic device. The following describes the graphics rendering method in the embodiments of this application in detail with reference to FIG. 4. A server may be the server shown in FIG. 1 or FIG. 2, and an electronic device may be the electronic device shown in any one of FIG. 1 to FIG. 3.

Figure 4:
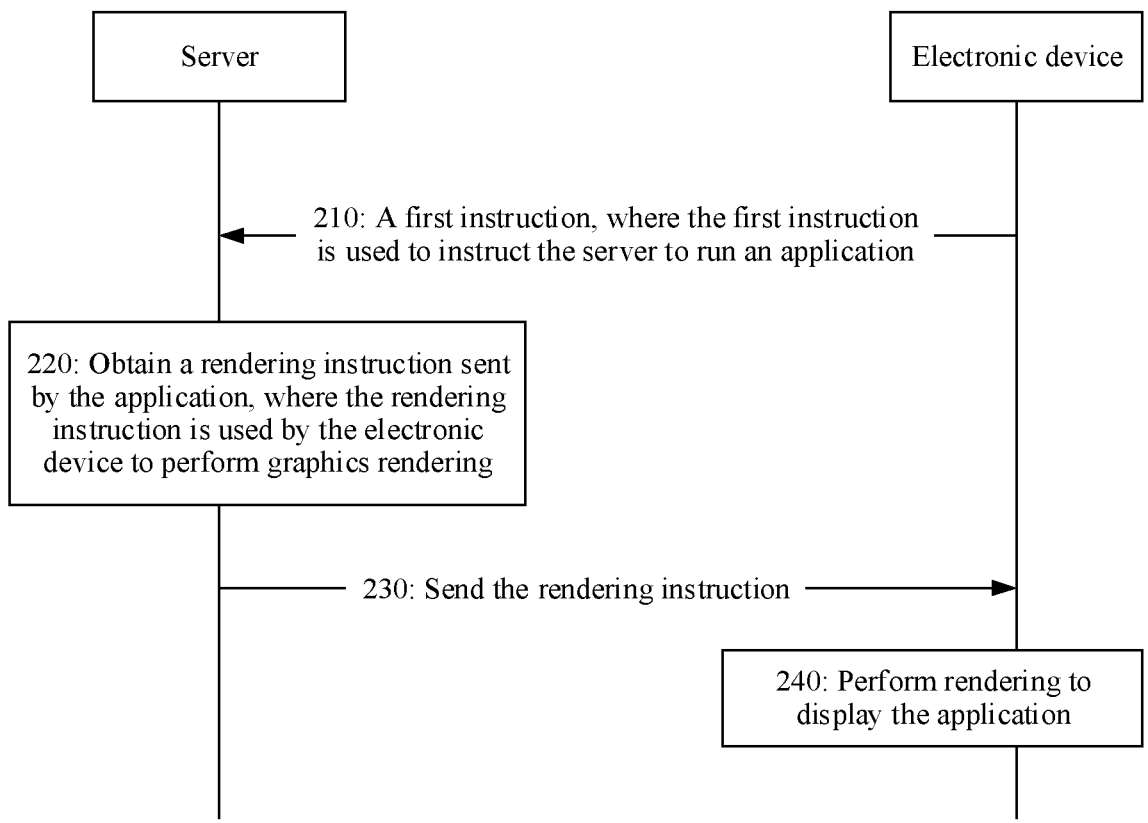
FIG. 4 is a flowchart of a graphics rendering method according to an embodiment of this application.

The method shown in FIG. 4 includes steps 210 to 240. The following describes these steps in detail.

210: The server receives a first instruction sent by the electronic device, where the first instruction is used to instruct the server to run an application.

In this embodiment of this application, the server may include one or more applications, and a client of the application may be installed on the electronic device. The electronic device may send an instruction to the server, to start running of the application in the server. In another embodiment, the server may automatically start the application. That the server starts the application does not need to be triggered by the electronic device.

220: The server obtains a rendering instruction sent by the application, where the rendering instruction is used by the electronic device to perform graphics rendering.

For example, as shown in FIG. 1 or FIG. 2, the interceptor in the server is configured to intercept the rendering instruction sent by the application. The interceptor may run, on the server, a segment of program used to obtain the rendering instruction sent by the APP.

230: The server sends the rendering instruction to an electronic device.

240: The electronic device performs rendering according to the rendering instruction, to display the application.

In this embodiment of this application, the server may send, to the electronic device, the rendering instruction that is obtained by the interceptor and that is of the application. For example, in the system architecture shown in FIG. 1 or FIG. 2, the server may send the rendering instruction to an electronic device by using the TCP or the agent.

Further, in this embodiment of this application, the server may store graphics rendering information, and the graphics rendering information is information required by the electronic device to perform graphics rendering. The graphics rendering information may be the intercepted rendering instruction sent by the application. Alternatively, the graphics rendering information may be a rendering information set obtained after the intercepted rendering instruction sent by the application is processed.

For example, as shown in FIG. 2, the server 130 may process the intercepted rendering instruction of the application. One copy of the instruction is sent to the electronic device, so that the electronic device performs graphics rendering according to the rendering instruction, and another copy may be stored in the electronic device.

For example, the server may process the intercepted rendering instruction, and store minimum rendering information required by the electronic device to restore a rendering context of the application. In other words, the server may save the rendering information set.

It should be understood that the rendering information set may be the minimum rendering information required by the electronic device to restore the rendering context of the application. For example, it is assumed that the rendering instruction may include 100 pieces of vertex data, the electronic device may perform graphics rendering based on 80 pieces of vertex data in the 100 pieces of vertex data, to construct a graph. In this case, the 80 pieces of vertex data that are in the 100 pieces of vertex data and that are required for constructing the graph may be the minimum rendering information. If 81 pieces of vertex data are sent to the electronic device, there is redundant information. If 79 pieces of vertex data are sent to the electronic device, the electronic device cannot construct the graph. The foregoing descriptions are examples, and do not constitute any limitation on this application.

Optionally, in this embodiment of this application, the server may receive a second instruction sent by the electronic device. The second instruction is used to request to restore a connection to the server. The server may send the graphics rendering information to the electronic device.

In this embodiment of this application, the rendering information set may be determined by the server. For example, the server may determine the rendering information set (for example, a key resource set shown in FIG. 6) according to a configured information list (for example, a key resource list shown in FIG. 6) and the rendering instruction. A preconfigured information list may include rendering information required for restoring the connection between the electronic device and the server.

For example, the preconfigured information list may be obtained by analyzing several engines and typical APPs that currently occupy an overwhelming majority of markets. The preconfigured information list is obtained by continuously capturing, repeatedly comparing, and analyzing a change of the rendering instruction and a change of the rendering context in cases such as a scenario change, a touch feedback, no input, and the like. The information list may include data or a status that is not retransmitted/reset in a multi-frame (a configurable threshold) graph.

For example, for same status information, a transmission process of data information of a multi-frame graph may be data A-data B-data C-data B-data C. It may be learned that the data B and the data C in data of the multi-frame graph are repeatedly transmitted, and the data A is data information that is not retransmitted/reset in the multi-frame graph. Therefore, in this case, the information list may include the data A or an index value of the data A.

It should be understood that the preconfigured information list may be a minimum set or an optimal set of the rendering context. If there is excessively more information in the preconfigured information list, there is redundancy in stored data. If there is excessively less data, the rendering context cannot be restored to perform graphics rendering.

Optionally, in this embodiment of this application, after receiving the instruction that is sent by the electronic device and that is used to request to restore the connection to the server, the server may send, to the electronic device, the graphics rendering information stored in the server.

In an example, the electronic device may receive the rendering instruction stored in the server, and the rendering instruction may be the rendering instruction that is intercepted by the server and that is sent by the application.

In an example, to reduce a waiting time required for reconnection upon disconnection, the electronic device may receive the rendering information set sent by the server. The rendering information set may be the minimum rendering information required by the electronic device to restore the rendering context of the application.

It should be understood that, in this embodiment of this application, the rendering instruction stored in the server may be an unprocessed instruction sent by the application. Alternatively, the server may further save storage space, process the obtained rendering information, and store the obtained rendering information set.

In this embodiment of this application, to ensure restoration of the rendering context, that is, to ensure that the electronic device can identify the rendering information set, an instruction sequence may be further determined, for example, the instruction sequence is constructed. The instruction sequence is used by a graphics processing unit of the electronic device to identify the rendering information set.

For example, the instruction sequence may be determined in the server. After the server sends the instruction sequence to the electronic device, the GPU of the electronic device may identify information that is in the instruction sequence and that is used for the graphics rendering.

For example, the instruction sequence may be determined in the electronic device. The server may send the rendering information set to the electronic device. After a CPU of the electronic device receives the rendering information set, the CPU of the electronic device determines the instruction sequence, and sends the instruction sequence from the CPU of the electronic device to the GPU of the electronic device. Therefore, the GPU of the electronic device performs graphics rendering based on the rendering information set.

In an example, the rendering information set may include first identification information and first rendering information. The first identification information may be identification information used by the server to identify the first rendering information. The electronic device may determine a mapping relationship. The mapping relationship is a correspondence between the first identification information and the second identification information, and the second identification information is identification information used by the electronic device to identify the first rendering information.

For example, the electronic device receives the rendering information set sent by the server. The rendering information set includes the first rendering information, and the first rendering information includes an identifier set by the server, for example, the identifier is #5. The GPU of the electronic device performs graphics rendering based on the first rendering information, and feeds back an identifier, for example, an identifier #4, to the electronic device. In this case, the electronic device may determine the mapping relationship, namely, a correspondence between #5 of the server and #4 of the electronic device.

In an example, to ensure that complexity is reduced when the electronic device restores the rendering context of the application, the server may reorder rendering information in the rendering information set according to a rendering order. The rendering order is an order of rendering information when a rendering pipeline of the electronic device runs graphics rendering. The server may send the reordered rendering information set to the electronic device.

Optionally, in this embodiment of this application, the electronic device may send a cache list to the server. The cache list includes rendering information that is of the electronic device and that is in a local cache. Further, after the server receives the request that is sent by the electronic device and that is used to restore the connection to the server, the server may first monitor the rendering instruction, and determine possible missing rendering information of the electronic device. The cache list of the electronic device is searched for the missing rendering information. If the missing rendering information exists in the cache list, a third instruction is sent to the electronic device. The third instruction is used to instruct the electronic device to obtain the missing rendering information from the local cache. Alternatively, the cache list of the electronic device is searched for the missing rendering information. If the missing rendering information does not exist in the cache list, the missing rendering information is sent to the electronic device.

It should be noted that, in this embodiment of this application, the server may first monitor a draw call or a key instruction sent by the application, to determine a resource required by the electronic device to restore the rendering context, and the server further determines whether the resource has been restored. If the server determines that the resource has not been restored, the server may search the cache list of the electronic device, to determine whether the resource exists in the cache list of the electronic device. When the resource exists in the cache list, the server may indicate the electronic device to obtain the resource from the local cache of the electronic device. When the resource does not exist in the cache list, the server may send the resource to the electronic device. If the server determines that the resource has been restored, the server does not perform any operation. The resource required for restoring the rendering context is the rendering information required by the electronic device to restore the rendering context, that is, may be the missing rendering information of the electronic device.

It should be understood that the rendering information that is of the electronic device and that is in the local cache may include data information but does not include status information. In other words, the rendering information that is of the electronic device and that is in the local cache may be data information used for the graphics rendering.

An OpenGL ES is used as an example. The draw call may include but is not limited to the following instructions:

glDrawArrays, glDrawElements, glDrawArraysInstanced, glDrawElementsInstanced, glDrawRangeElements, glDrawArraysIndirect, and glDrawElementsIndirect.

An OpenGL ES is used as an example. The key instruction may include but is not limited to the following instructions:

glBindBuffer, glBufferData, glBufferSubData, glBindTexture, glTexImage2D, glTexSubImage2D, glTexImage3D, glTexSubImage3D, glCompressedTexImage2D, glCompressedTexSubImage2D, glCompressedTexImage3D, and glCompressedTexSubImage3D.

In this application, separation and rendering may be implemented by using an instruction stream solution. The server may obtain the rendering instruction sent by the application, and send the rendering instruction to an electronic device connected to the server. The electronic device that receives the rendering instruction performs graphics rendering, thereby avoiding a phenomenon that in a video stream separation and rendering solution, the server performs graphics rendering, to generate a video stream adapted to a fixed screen size, and if a size of a picture rendered by the electronic device does not match a size of a picture rendered by the server, an image is stretched or compressed. In the technical solution of this application, the server may send, to the electronic device, a rendering instruction stream used for the graphics rendering. On one hand, load of a graphics processing unit of the server can be reduced. On the other hand, the rendering instruction is sent to the electronic device, and the electronic device performs graphics rendering on a device side according to the rendering instruction. This can better adapt to a screen size of the electronic device, and improve picture quality and user experience.

This application further provides a graphics rendering method. The method can implement on-demand rendering in a video stream separation and rendering solution. A server may perform on-demand rendering based on a status of a connection between an electronic device and the server. If the electronic device and the server are in a connected state, a graphics processing unit of the server may perform graphics rendering according to a rendering instruction, to generate a video stream. If the electronic device and the server are in an offline state, the graphics processing unit of the server does not perform graphics rendering.

In an example, this application proposes a graphics rendering method, including: a server receives a fourth instruction sent by an electronic device, where the fourth instruction is used to instruct the electronic device to disconnect from the server; the server obtains a rendering instruction sent by an application, where the rendering instruction is used by a graphics processing unit of the server to perform graphics rendering, to generate a video stream; the server determines graphics rendering information according to the rendering instruction, where the graphics rendering information is rendering information required by the server to generate the video stream; and the server stores the graphics rendering information.

It should be noted that the foregoing embodiment of this application is also applicable to the video stream separation and rendering solution. A difference between the video stream separation and rendering solution and the instruction stream separation and rendering solution lies in that in the instruction stream separation and rendering solution, the stored graphics rendering information is sent to the electronic device, and the electronic device performs graphics rendering based on the graphics rendering information. However, in the video stream separation and rendering solution, the stored graphics rendering information may be sent to the graphics processing unit of the server, and the graphics processing unit of the server performs graphics rendering according to the graphics rendering instruction to generate the video stream, and sends the video stream to the electronic device. In the foregoing embodiment, a process of storing the graphics rendering information and restoring the rendering context is also applicable to the video stream separation and rendering solution, and details are not described herein again.

Optionally, in this embodiment of this application, the server receives a second instruction sent by the electronic device. The second instruction is used to request to restore a connection between the electronic device and the server. The server performs graphics rendering based on the graphics rendering information to generate the video stream. The server sends the video stream to the electronic device.

In this application, after the electronic device is disconnected from the server, the server may not perform graphics rendering, and may store the graphics rendering information in the server. The graphics rendering information may be information required by the server to perform graphics rendering. After the server receives a request sent by the electronic device to restore the connection to the server, the server may perform graphics rendering based on the graphics rendering information to generate the video stream, and send the video stream to the electronic device. Therefore, on-demand rendering is implemented between the server and the electronic device, thereby further reducing pressure on the GPU of the server. In this way, density of instances running on the server is significantly improved in the video stream separation and rendering solution.

In an example, the graphics rendering information may be the rendering instruction. The rendering information stored in the server may be the obtained rendering instruction sent by the application.

In an example, the graphics rendering information may be a rendering information set. The rendering information set is used by the electronic device to restore the rendering context of the application.

Optionally, in this embodiment of this application, the determining graphics rendering information according to the rendering instruction includes: determining the rendering information set according to a preconfigured information list and the rendering instruction. The preconfigured information list includes rendering information required for restoring the connection between the electronic device and the application.

Optionally, in this embodiment of this application, the server may further determine an instruction sequence. The instruction sequence is used by a graphics processing unit of the server to identify the rendering information set.

For example, a central processing unit of the server determines the instruction sequence. The instruction sequence is used by the graphics processing unit of the server to identify the rendering information set. Therefore, the graphics processing unit of the server performs graphics rendering based on the rendering information set, to generate the video stream.

Figure 5:
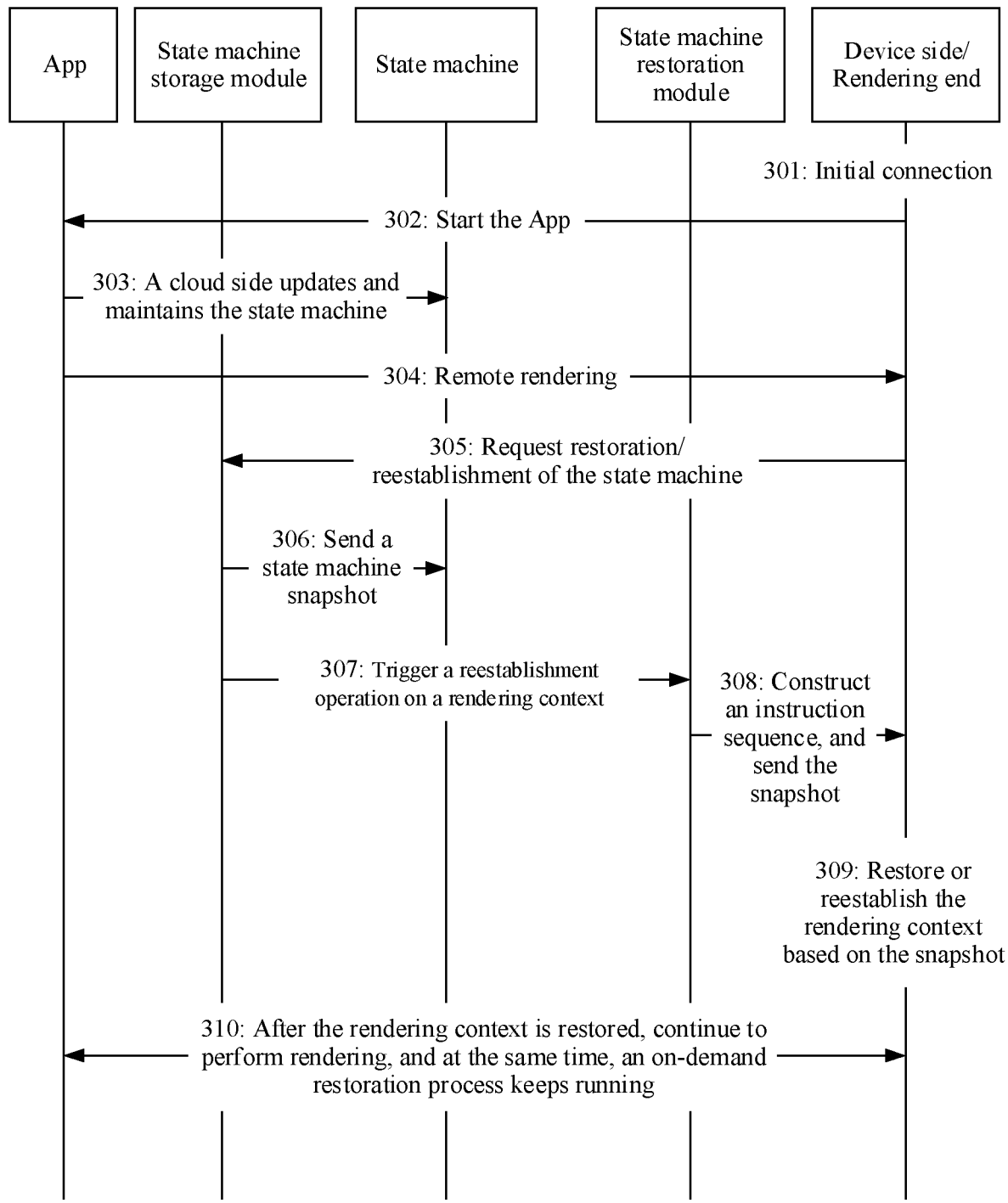
FIG. 5 is a flowchart of a graphics rendering method according to another embodiment of this application.

FIG. 5 is a flowchart of a graphics rendering method according to an embodiment of this application. The method shown in FIG. 5 may include steps 301 to 310. The following describes steps 301 to 310 in detail. A device side/rendering end may be any electronic device shown in FIG. 1 to FIG. 4. An APP, a state machine storage module, and a state machine may be located in a server, and a state machine restoration module may be located in the electronic device or the server. It should be understood that, in this application, the state machine may be a rendering context.

Step 301: The device side/rendering end is initially connected. In other words, the device side/rendering end may be initially connected to the APP in the server.

Step 302: The device side/rendering end may send a start instruction to the APP.

For example, the instruction may be the first instruction in FIG. 4.

Step 303: A cloud side updates and maintains the state machine.

It should be noted that the cloud side updating and maintaining the state machine may be that the server stores and updates, in real time according to a received rendering instruction sent by the APP, data and a state that are required for graphics rendering by using a corresponding data structure.

Step 304: Perform remote rendering, that is, send, to the electronic device, the rendering instruction sent by the APP, and the electronic device performs graphics rendering according to the obtained rendering instruction.

Step 305: The state machine storage module receives an instruction sent by the device side/rendering end for requesting restoration/reestablishment of the state machine.

The instruction for requesting the restoration/reestablishment of the state machine may be the second instruction in the foregoing embodiment, and the second instruction is used to request to restore a connection between the electronic device and the server.

In this application, after receiving a triggering command of requesting the restoration/reestablishment of the state machine or another triggering command sent by the device side, the cloud side extracts a key resource in the state machine according to a preset key resource list. Further, resource rearrangement may be performed on the extracted key resource according to a resource dependency (which may be the rendering order in the foregoing embodiment), and a snapshot is generated. The snapshot may be a copy of a key resource set at a specific moment.

Figure 6:
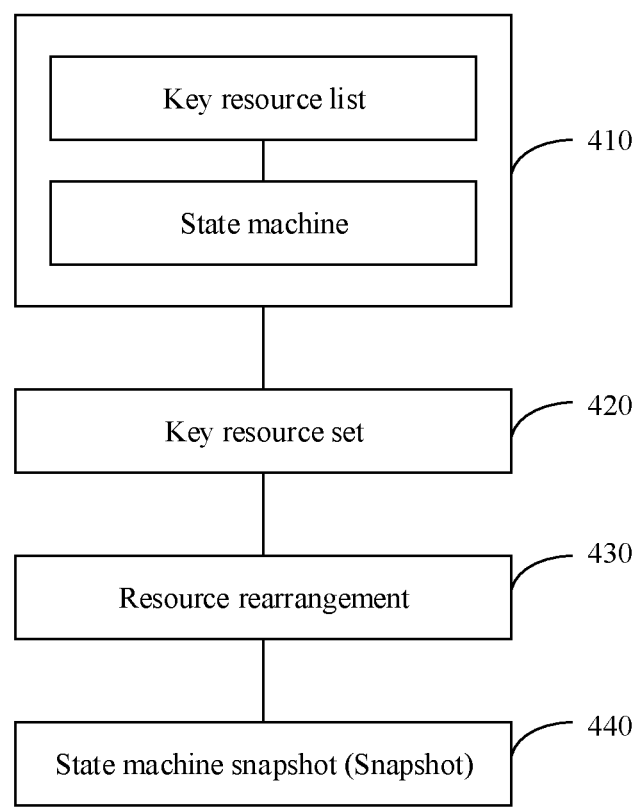
FIG. 6 is a flowchart of determining a state machine snapshot according to an embodiment of this application.

FIG. 6 is a flowchart of generating a snapshot by a server according to an embodiment of this application. FIG. 6 includes steps 410 to 440. The following describes steps 410 to 440 in detail.

Step 410: Obtain a key resource list and a state machine.

A resource required by a rendering context is rendering information. The resource includes data information and status information. Android separation and rendering (also applicable to iOS) is used as an example. The resource can be divided into an EGL layer and an OpenGL ES layer. A OpenGL ES resource includes the following parts.

OpenGL ES status information may include but is not limited to the following content:

1: Binding of various global states, such as binding of a buffer to a target and setting of current parameters.
    2: Setting of a vertex attribute pointer.
    3: Binding of all Texture, EGLImage, and Sampler.
    4: Binding of a Framebuffer object and a RenderBuffer object.
    5: Binding of Program and Shader and a current status of the binding.
    6: Setting of a vertex attribute and a uniform variable.

Data corresponding to these binding relationships (namely, statuses) may include but is not limited to the following content:

1: Buffer data.
    2: Sampler data.
    3: Texture data.
    4: FrameBuffer/RenderBuffer data.
    5: Shader string data.

In this embodiment of this application, the key resource list may be a preconfigured information list, and the key resource list may be abstracted by analyzing rendering instruction sequences of each game engine in different cases. The key resource list may be a minimum set or an optimal set of the rendering context. The snapshot is expanded due to excessively more information in the key resource list. The rendering context cannot be restored with excessively less information in the key resource list. Therefore, abstraction and definition of the key resource list are crucial.

The abstraction of the key resource list may be a static process. The key resource list may not be obtained from a CPU or a GPU of the current server by using a specific API or method. Data or a status that is included in the key resource list and that is not retransmitted/reset in multiple frames (a preset threshold) may be obtained by analyzing several engines and typical APPs that currently occupy an overwhelming majority of markets and by continuously capturing, repeatedly comparing, and analyzing a change of the rendering instruction and a change of the rendering context in cases such as a scenario change, a touch feedback, no input, and the like.

For example, that the key resource list is determined may include but is not limited to the following steps:

Step 1: Classify the engines, and determine to capture rendering instructions in different scenarios.

Step 2: Determine a scenario, and set a preset quantity of frames, for example, 100 frames.

Step 3: Determine rendering information that is with a relatively small quantity of retransmission times and that is in an image with the preset quantity of frames.

Step 4: Repeatedly perform step 1 to step 3 in different scenarios, and finally determine a union set of rendering information that is obtained in the different scenarios and that is transmitted for a relatively small quantity of times as the key resource list.

In addition to the foregoing steps, the key resource list may be further obtained with reference to a rendering information transmission status in another case such as the touch feedback or no input.

It should be understood that, in this embodiment of this application, the key resource list may also be obtained based on an artificial intelligence (AI) technology. AI may be a theory, a method, a technology, and an application system that use a digital computer or machine simulation controlled by a digital computer to extend human intelligence, sense an environment, obtain knowledge, and obtain an optimal result by using the knowledge. For example, the key resource list may be obtained based on a neural network algorithm or a computer algorithm model. The foregoing is an example for description, and no limitation is imposed on a source manner of the key resource list.

To improve efficiency, the key resource list is usually obtained offline. However, if the key resource list is obtained in a highly efficient manner, the key resource list may also be obtained online in real time in this manner. This is not limited in this application.

In an example, key resources may include but are not limited to the following resources:
1: A global status that is updated when only an initial switchover is performed in a few scenarios or a given scenario.
2: Data, namely, the buffer and texture data in the foregoing five types of data but excluding setting statuses of most texture attributes, corresponding to all instructions that are updated by invoking a sub instruction.
3: All resources and current statuses of a Program/Shader string, including a compiled state, an attached state, a uniform setting variable, and a small quantity of vertex attributes that are not frequently updated.
4: An attach point status (binding) of a frame buffer/render buffer object and corresponding data of the attach point status, excluding a parameter configured in glreadbuffer/gldrawbuffers.

Setting of most global statuses and information such as the setting of the vertex attribute pointer corresponding to Program are continuously updated in each draw call. Therefore, this part of statuses or data clearly belongs to non-key resources, requires no restoration, and can be obtained in a subsequent draw call.

In this application, the state machine may implement a complete EGL/OpenGL ES standard, and may intercept and invoke all rendering instructions sent by the APP. Resources included in the rendering instructions may belong to different contexts. After determining that a current rendering instruction belongs to an OpenGL ES version, the state machine distributes the current rendering instruction to a corresponding context, and then distributes the current rendering instruction to different object resources based on a type of a resource included in the rendering instruction. Each object resource may include many object resource instances.

The rendering instruction sent by the APP may be intercepted in the server. One copy of the instruction is normally sent to an electronic device, and one copy of the instruction is redirected to the state machine of the server. Modifications, for example, operations such as resource creation, deletion, and binding relationship maintenance, that are performed on a rendering context resource and a status, are synchronized to each ObjectResource of the context, to ensure that the state machine in the server is complete, and state transition can be continuously performed.

It should be noted that one state machine may be maintained in the server, and an objective of the state machine is to be able to continuously receive the rendering instruction intercepted from the APP, and update the rendering instruction to a corresponding data structure. When the electronic device requests to restore the state machine, a key resource set is extracted from the state machine by using a key resource list.

Step 420: Determine the key resource set. The server determines the key resource set according to the key resource list and the state machine in step 410.

It should be understood that the key resource list may be the preconfigured information list. When a device side requests to restore the state machine, the server may extract the key resource set from the state machine by using the key resource list.

Step 430: Perform resource rearrangement.

In this application, because there is a dependency relationship between resources of different types, resources that depend on each other may be rearranged. It is ensured that during restoration of the rendering context, there is no need to concern complexity of instruction construction caused by the resource dependency relationship. The dependency relationship may be the rendering order. The rendering order is an order of the rendering information when a rendering pipeline of the electronic device runs graphics rendering.

For example, a global resource needs to be stored only after object data is stored, and a texture/image resource needs to be stored before FrameBuffer is stored. A resource storage order (storage of an Android state machine is used as an example) can be as follows: EGL layer resource-ObjectResource<Buffer>-ObjectResource<VertexArray>-ObjectResource<Texture>-ObjectResource<Sampler>-ObjectResource<Program/Shader>-ObjectResource<RenderBuffer>-ObjectResource<FrameBuffer>-global status.

Step 440: Determine a state machine snapshot.

In this application, the key resource (data+status) may be determined based on the resource rearrangement, the state machine snapshot is generated. The state machine snapshot may be made persistent, or may be selectively resided in a memory on a cloud side.

After the server shown in FIG. 6 generates the schematic diagram of the snapshot, step 306 in the schematic flowchart of the graphics rendering method shown in FIG. 5 may be performed, to send the state machine snapshot. The state machine snapshot may be the reordered rendering information set in the embodiment shown in FIG. 4.

Step 307: Trigger a reestablishment operation on the rendering context.

It should be understood that the reestablishment operation on the rendering context may be performed in the electronic device, or may be performed in the server.

The following describes an example in which the reestablishment operation on the rendering context is performed in the electronic device.

In the foregoing step 430, the server may rearrange the key resource set according to the rendering order. Therefore, when the rendering context is reestablished, that is, when the rendering context is restored, a problem of a resource restoration failure caused by a resource order can be ignored. Different instruction sequences need to be generated based on a current state of each type of resource. In other words, an instruction sequence that can be identified by the GPU of the electronic device needs to be constructed based on the current state of each type of resource. Restoration of a Program/Shader-related resource is used as an example for description:

```
for (each program in Snapshot. ObjectResource<Program/Shader>) {
  program->create (program.serverHandle);
  if(program->linked) {//if this program has linked
    create/compile/attach local shaders;
    bindlinkedAttributions ( );
    useprogram (program.serverHandle);
    program->restoreUniform( );
  }
  else {//not linked status
    attach shaders;
  }
}
```

The foregoing code may be pseudo-code for constructing the instruction sequence. Each type of object resources includes a plurality of object resource instances, and each type of object resources maintains one map. For example, a map<serverHandle, program> of Program/Shader ObjectResource is used to store an instance identifier of this type of object resource and a mapping of the instance itself. Each instance is in a determined state when the state machine is triggered to store the instance.

For Program/Shader ObjectResource, ObjectResource <Program/Shader> is traversed. Regardless of a current status of the instance, the identifier needs to be used as a parameter, to construct an instruction and send the instruction to the device side. This triggers the device side to establish a mapping map<serverHandle, clientHandle> between a resource identifier on the device side and a resource identifier on the cloud side. The resource identifier on the device side and the resource identifier on the cloud side identify same data and are used to operate a resource on the device side after the state machine is restored.

It should be noted that a process of reestablishing the rendering context may be as follows. After the data and the status that are in the rendering context and that are stored on the cloud side are disassembled, an instruction sequence that conforms to a GPU pipeline (rendering pipeline) architecture is constructed based on the current status of each resource, a GPU API standard, and a specific rule and order is sent to a render thread (RenderThread) on the device side, to perform graphics rendering. In this process, a resource included in the instruction sequence is reloaded to a GPU on the device side. Correspondingly, the GPU on the device side generates a new identifier used for operating the resource. In the process of reestablishing the rendering context, all GPU resources that are reloaded to the device side are re-identified. If graphics rendering needs to be performed in the reestablished rendering context, these "new" resources need to be "identified". Therefore, a resource mapping mechanism is required, namely, a mapping relationship between a rendering context resource identifier on the cloud side and a context resource identifier on a rendering side.

For example, the electronic device may determine a resource mapping. In other words, the rendering instruction constructed on the cloud side includes a resource and an identifier number of the resource. When the device side executes the instruction during the restoration, an identifier for the resource is also generated on the device side, and a mapping relationship map<serverHandle, clientHandle> between the identifier generated on the device side and the resource identifier sent by the cloud side is established. After the rendering context is restored and a normal rendering phase is entered, the cloud side uses the identifier of the resource to operate the resource. The device side can use an identifier on the device side after the resource mapping to replace the identifier on the cloud side, and then perform the graphics rendering operation. In other words, the device side can access any data or status on the cloud side.

After the mapping between the resource identifier on the device side and the resource identifier on the cloud side is established, a status that is of the instance and that is in the snapshot resource may be read. Because it requires the state machine to store a rendering context at a moment before the operation is triggered, different instruction sequences may be determined based on statuses. If a current Program instance has been linked, a shader instance on a mount point is created, compiled, and mounted, and a few vertex attributes that are not frequently updated are set. The Program instance is used (used by using an instance identifier) to set the uniform variable in the key resource. If a current Program instance has not been linked, only shader instance on a mount point of the Program instance needs to be remounted. The foregoing descriptions are examples, and do not constitute any limitation on this application.

It should be noted that the foregoing uses ObjectResource<Program/Shader> as an example for description. For another type of ObjectResource, customized instruction sequence construction similar to ObjectResource<Program/Shader> is used, where customized instruction sequence construction is performed based on the status of each instance that is stored by the state machine before the operation is triggered.

Figure 7:
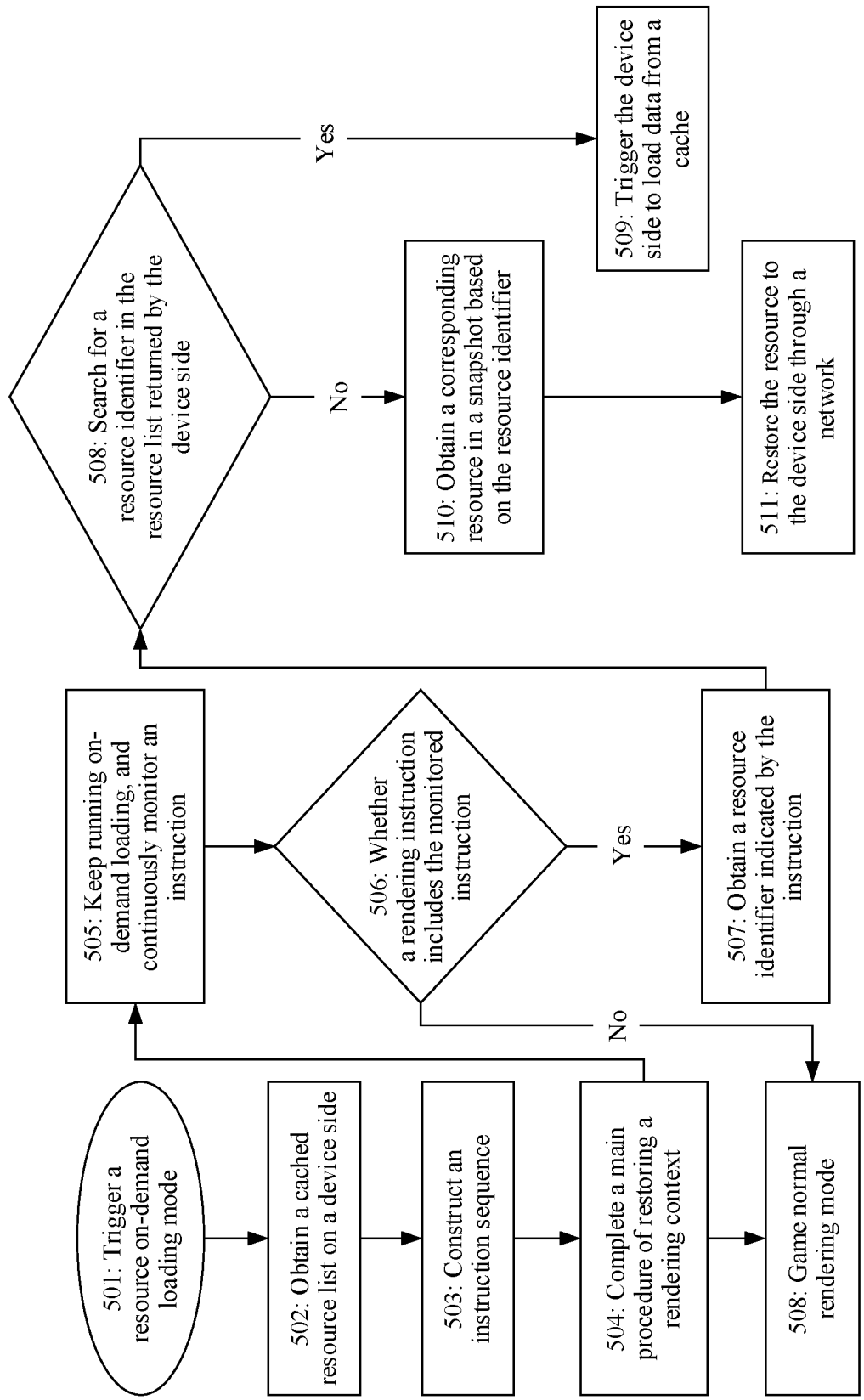
FIG. 7 is a flowchart of an on-demand loading method according to an embodiment of this application.

FIG. 7 is a flowchart of a method for accelerating rendering context restoration according to an embodiment of this application. FIG. 7 includes steps 501 to 511. The following describes steps 501 to 511 in detail.

It should be noted that, in this embodiment of this application, a device side may be any electronic device shown in FIG. 1 to FIG. 4, and a cloud side may be any server shown in FIG. 1, FIG. 2, and FIG. 3.

Step 501: Trigger a resource on-demand loading mode.

It should be noted that the on-demand loading mode may take effect when an instruction sequence is constructed, that is, at an initial stage that a state machine restoration module runs. The cloud side may monitor a draw call or a key instruction on the device side, load/restore only a strongly dependent resource of a current frame or key instruction, and load another resource after a delay. In addition, after the device side restores/reestablishes a rendering context, rendering can continue to be performed based on an on-demand restoration/resource cache acceleration algorithm. The cloud side can continuously monitor the draw call or the key instruction, and continuously load a service for the strongly dependent resource of the subsequent current frame or key instruction.

Step 502: Obtain a cached resource list on the device side.

For example, on the device side, a texture resource and a vertex resource that account for a relatively large proportion (75% to 99.7%) in the state machine may be cached on the device side. When the rendering context is restored, the two parts of resources may be directly read from a cache database on the device side and loaded to a GPU on the device side. This can significantly reduce a data transmission volume of a network in a rendering context restoration process, thereby reducing a waiting time required for restoring the rendering context.

Step 503: Construct the instruction sequence, that is, determine the instruction sequence in the foregoing embodiment.

For example, a process of reestablishing the rendering context may be as follows. After data and a status that are in the rendering context and that are stored on the cloud side are disassembled, an instruction sequence that conforms to a GPU pipeline (rendering pipeline) architecture is constructed based on a current status of each resource, a GPU API standard, and a specific rule and order.

Step 504: Complete a main procedure of restoring the rendering context.

Completion of the main procedure of restoring the rendering context may be corresponding to step 305 to step 309 shown in FIG. 5.

Step 505: Keep running on-demand loading, and continuously monitor the draw call/key instruction of the electronic device.

An OpenGL ES is used as an example. The draw call may include but is not limited to the following instructions:

glDrawArrays, glDrawElements, glDrawArraysInstanced, glDrawElementsInstanced, glDrawRangeElements, glDrawArraysIndirect, and glDrawElementsIndirect.

An OpenGL ES is used as an example. The key instruction may include but is not limited to the following instructions:

glBindBuffer, glBufferData, glBufferSubData, glBindTexture, glTexImage2D, glTexSubImage2D, glTexImage3D, glTexSubImage3D, glCompressedTexImage2D, glCompressedTexSubImage2D, glCompressedTexImage3D, and glCompressedTexSubImage3D.

Step 506: Determine whether the obtained rendering instruction includes the monitored draw call/key instruction.

It should be understood that texture resources or vertex resources required by the device side to restore the rendering context may be determined according to the monitored draw call/key instruction. In step 502, some of the texture resources and the vertex resources may be cached on the device side. Therefore, if the rendering instruction on the device side includes the draw call/key instruction, step 507 is performed. If the rendering instruction on the device side does not include the draw call/key instruction, step 508 is performed, and a game normal rendering mode is run. The game normal rendering mode may be instruction interception. One copy is sent to a state machine module, and one copy is sent to the device side, which is the same as that before a state machine restoration procedure is triggered.

In other words, after the device side triggers the state machine restoration procedure, the cloud side may run in the on-demand loading mode, that is, continuously monitor the draw call and the key instruction. If the rendering instruction intercepted by the cloud side includes the draw call and the key instruction, cached resource searching is triggered. Some or all of resources indicated by the monitored draw call/key instruction may exist in a local cache of the electronic device. Therefore, a cache list of the electronic device may be searched. Otherwise, only the game normal rendering mode is entered.

Step 507: The cloud side obtains all resource identifiers indicated by the draw call/key instruction.

Step 508: Search for a resource identifier in the cache resource list sent by the device side.

For example, the cached resource searching may be that all resource lists (a mapping between a sha256sum value of a resource and the resource) that are obtained from the device side when the on-demand loading mode is triggered and that are cached by the device side are searched for the resource indicated by the draw call and key instruction. The sha256sum value of the resource is calculated and used as a key to search for the resource in the resource list. If the resource can be found in the resource list cached on the device side, it indicates that the device side has cached the resource. The cloud directly sends the sha256sum value of the resource to the device side, and notifies the device side to load the resource from the cache database to the GPU. Otherwise, the cloud side may send the resource to the device side through the network.

Step 509: Trigger the device side to load the rendering information from a local cache of the device side.

Step 510: Obtain, based on the resource identifier, a resource corresponding to the identifier from an obtained state machine snapshot.

Step 511: Send the resource to the device side through the network.

In this embodiment of this application, a speed of restoring the rendering context may be accelerated according to the foregoing on-demand loading manner. In other words, the waiting time required for restoring the rendering context is reduced based on the rendering information cached in the electronic device and restored rendering information related to a current frame of a graph.

It should be understood that the foregoing example descriptions are intended to help a person skilled in the art understand the embodiments of this application, but are not intended to limit the embodiments of this application to a specific value or a specific scenario in the examples. It is clearly that a person skilled in the art can make various equivalent modifications or changes according to the examples described above, and such modifications or changes also fall within the scope of the embodiments of this application.

The foregoing describes in detail the graphics rendering method provided in the embodiments of this application with reference to FIG. 1 to FIG. 7. The following describes in detail apparatus embodiments of this application with reference to FIG. 8 to FIG. 11. It should be understood that a graphics rendering apparatus in the embodiments of this application may perform the methods in the foregoing embodiments of this application. For specific working processes of the following various products, refer to corresponding processes in the foregoing method embodiments.

Figure 8:
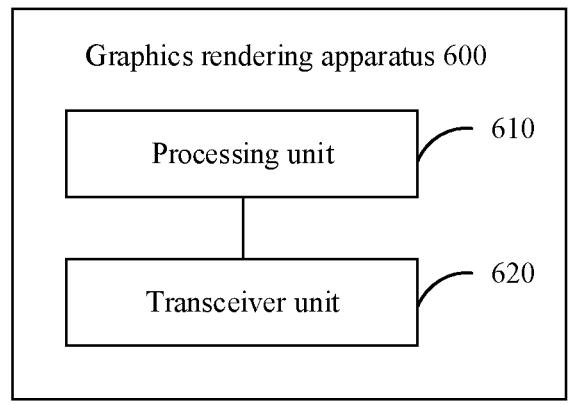
FIG. 8 is a diagram of a graphics rendering apparatus according to an embodiment of this application.

FIG. 8 is a schematic block diagram of a graphics rendering apparatus 600 according to an embodiment of this application. It should be understood that the apparatus 600 can perform the steps in the methods in FIG. 4 to FIG. 7. To avoid repetition, details are not described herein again. The graphics rendering apparatus 600 may be a server, or the graphics rendering apparatus 600 may be a chip configured in a server.

In an example, the graphics rendering apparatus 600 includes a processing unit 610 and a transceiver unit 620. The processing unit 610 is configured to start an application, and obtain a rendering instruction sent by the application. The transceiver unit 620 is configured to send the rendering instruction to an electronic device. The rendering instruction is used by the electronic device to perform graphics rendering, to display an image related to the application.

It should be noted that the graphics rendering apparatus 600 shown in FIG. 8 may be the server shown in FIG. 1 or FIG. 2. The transceiver unit 620 may implement a corresponding function of the server communications interface shown in FIG. 1 or FIG. 2. The processing unit 610 may correspondingly implement a corresponding function of the interceptor shown in FIG. 1. Alternatively, the processing unit 610 may correspondingly implement functions corresponding to the interceptor, the storage module, and the restoration module shown in FIG. 2. The transceiver unit 620 may implement a TCP/agent function corresponding to FIG. 1 or FIG. 2.

Optionally, in an implementation, the processing unit 610 is further configured to store graphics rendering information. The graphics rendering information is information required by the electronic device to perform graphics rendering.

Optionally, in an implementation, the transceiver unit 620 is further configured to: receive a second instruction sent by the electronic device, where the second instruction is used to request to restore a connection to the server; and send the graphics rendering information to the electronic device in response to the second instruction. The graphics rendering information is used by the electronic device to restore a rendering context, and the rendering context is a rendering context of the application when the second instruction is received.

Optionally, in an implementation, the graphics rendering information is the rendering instruction.

Optionally, in an implementation, the graphics rendering information is a rendering information set, and the graphics rendering information is the rendering information set obtained by processing the rendering instruction.

Optionally, in an implementation, the processing unit 610 is further configured to:

determine the rendering information set according to a preconfigured information list and the rendering instruction. The preconfigured information list includes rendering information whose quantity of retransmission times is less than a predetermined threshold.

Optionally, in an implementation, the processing unit 610 is further configured to:

reorder rendering information in the rendering information set according to a rendering order. The rendering order is an order of rendering information when a rendering pipeline of the electronic device runs graphics rendering.

The transceiver unit 620 is configured to:

send the reordered rendering information set to the electronic device.

Optionally, in an implementation, the transceiver unit 620 is further configured to:

receive a cache list sent by the electronic device. The cache list is a list of rendering information cached by the electronic device.

The processing unit 610 is further configured to:

send some or all of the graphics rendering information to the electronic device according to the cache list. The sent graphics rendering information is graphics rendering information that does not exist in the cache list.

Optionally, in an implementation, the processing unit 610 is further configured to:

determine an instruction sequence. The instruction sequence is used by a graphics processing unit of the electronic device to identify the rendering information set.

The transceiver unit 620 is configured to:

send the instruction sequence and the rendering information set to the electronic device.

In an example, the graphics rendering apparatus 600 includes a processing unit 610 and a transceiver unit 620. The transceiver unit 620 is configured to receive a fourth instruction sent by an electronic device, where the fourth instruction is used to instruct the electronic device to disconnect from a server. The processing unit 610 is configured to: receive a second instruction sent by the electronic device, where the second instruction is used to request to restore a connection between the electronic device and the server; store graphics rendering information, where the graphics rendering information is used to restore a rendering context, and the rendering context is a rendering context of the application when the second instruction is received; and perform graphics rendering based on the graphics rendering information, to generate a video stream. The transceiver unit 620 is further configured to send the video stream to the electronic device.

It should be noted that the graphics rendering apparatus 600 shown in FIG. 8 may be the server shown in FIG. 1 or FIG. 2. The transceiver unit 620 may implement a corresponding function of a server communications interface. The processing unit 610 may correspondingly implement a corresponding function of the interceptor shown in FIG. 1. Alternatively, the processing unit 610 may correspondingly implement functions corresponding to the interceptor, the storage module, and the restoration module shown in FIG. 2. The transceiver unit 620 may implement a TCP/agent function corresponding to FIG. 1 or FIG. 2.

Optionally, in an implementation, the graphics rendering information is the rendering instruction.

Optionally, in an implementation, the graphics rendering information is a rendering information set obtained by processing the rendering instruction.

Optionally, in an implementation, the processing unit 610 is further configured to determine the rendering information set according to a preconfigured information list and the rendering instruction. The preconfigured information list includes rendering information whose quantity of retransmission times is less than a predetermined threshold.

Optionally, in an implementation, the processing unit 610 is further configured to determine an instruction sequence. The instruction sequence is used by a graphics processing unit of the server to identify the rendering information set.

It should be understood that the graphics rendering apparatus 600 herein is implemented in a form of a functional unit. The term "unit" herein may be implemented in a form of software and/or hardware. This is not specifically limited. For example, the "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 9:
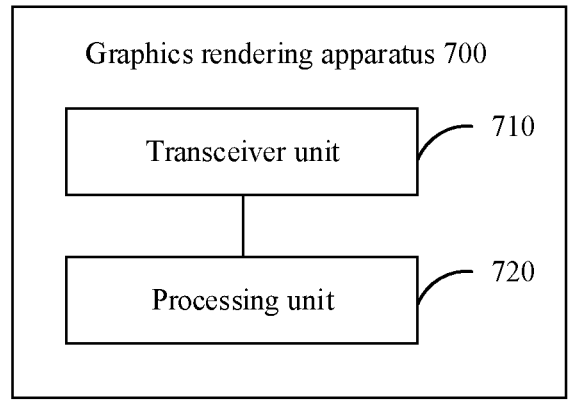
FIG. 9 is a diagram of a graphics rendering apparatus according to another embodiment of this application.

FIG. 9 is a diagram of a graphics rendering apparatus 700 according to an embodiment of this application. It should be understood that the apparatus 700 can perform the steps in the methods in FIG. 4 to FIG. 7. To avoid repetition, details are not described herein again. The graphics rendering apparatus 700 may be an electronic device, or the graphics rendering apparatus 700 may be a chip configured in an electronic device. The graphics rendering apparatus 700 includes a transceiver unit 710 and a processing unit 720. The transceiver unit 710 is configured to receive a rendering instruction sent by the server. The rendering instruction is used by the electronic device to perform graphics rendering. The processing unit 720 is configured to perform graphics rendering according to the rendering instruction.

Optionally, in an implementation, the transceiver unit 710 is further configured to send a second instruction to the server, where the second instruction is used to request to restore a connection between the electronic device and the server, and receive graphics rendering information sent by the server. The processing unit 720 is further configured to restore a rendering context based on the graphics rendering information, where the rendering context is a rendering context of the application when the second instruction is sent.

Optionally, in an implementation, the graphics rendering information is the rendering instruction.

Optionally, in an implementation, the graphics rendering information is a rendering information set obtained by processing the rendering instruction.

Optionally, in an implementation, the processing unit 720 is further configured to determine an instruction sequence. The instruction sequence is used by a graphics processing unit of the electronic device to identify the rendering information set.

Optionally, in an implementation, the rendering information set includes first identification information and first rendering information, and the first identification information is identification information used by the server to identify the first rendering information. The processing unit 720 is further configured to determine a mapping relationship. The mapping relationship is a correspondence between the first identification information and the second identification information, and the second identification information is identification information used by the electronic device to identify the first rendering information.

It should be understood that the graphics rendering apparatus 700 herein is implemented in a form of a functional unit. The term "unit" herein may be implemented in a form of software and/or hardware. This is not specifically limited. For example, the "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 10:
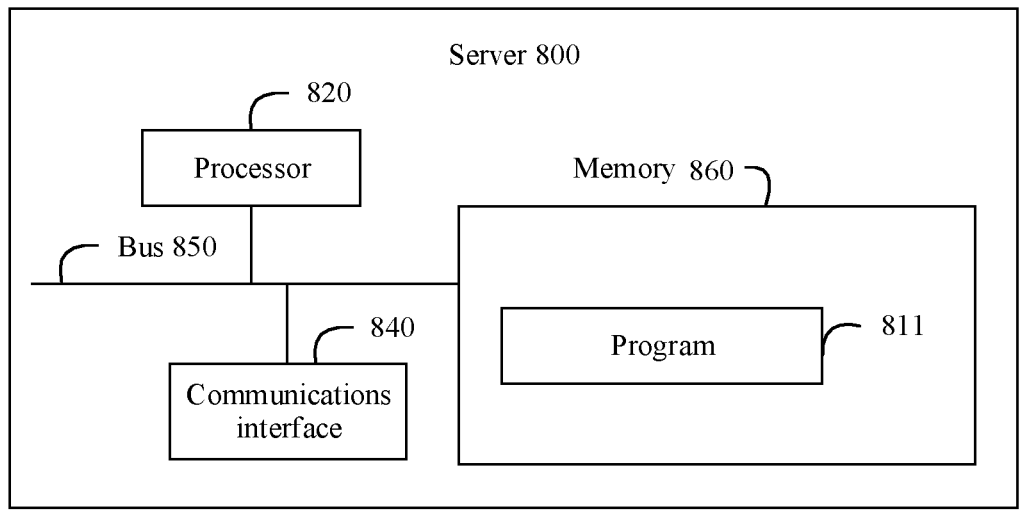
FIG. 10 is a diagram of a server according to an embodiment of this application.

FIG. 10 is a diagram of a server 800 according to an embodiment of this application. The server 800 includes a processor 820, a memory 860, a communications interface 840, and a bus 850. The processor 820, the memory 860, and the communications interface 840 communicate with each other through the bus 850, or may implement communication by wireless transmission or by another means. The memory 860 is configured to store an instruction, and the processor 820 is used to execute the instruction stored in the memory 860. The memory 860 stores program code 811, and the processor 820 may invoke the program code 811 stored in the memory 860, to perform the graphics rendering methods shown in FIG. 4 to FIG. 7.

For example, the processor 820 may be configured to execute step 220 in FIG. 4 to obtain the rendering instruction sent by the application, or execute a procedure of determining the state machine snapshot shown in FIG. 6.

The memory 860 may include a read-only memory and/or a random access memory, and provide an instruction and data to the processor 820. The memory 860 may further include a non-volatile random access memory. The memory 860 may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), or a direct rambus dynamic random access memory (direct rambus RAM, DR RAM).

The bus 850 may further include a power bus, a control bus, a status signal bus, and the like, in addition to a data bus. However, for clear description, various types of buses in FIG. 8 are marked as the bus 850.

In the server 800 shown in FIG. 10, the processor 820 may perform a step/function corresponding to the processing unit 610 shown in FIG. 8, and the communications interface 840 may perform a step/function corresponding to the transceiver unit 620 shown in FIG. 8.

It should be understood that the server 800 shown in FIG. 10 can implement the processes performed by the devices in the method embodiments shown in FIG. 4 to FIG. 7. Operations and/or functions of the modules in the server 800 are intended to implement corresponding procedures in the foregoing method embodiments. For details, refer to the descriptions in the foregoing method embodiments. To avoid repetition, detailed descriptions are properly omitted herein.

Figure 11:
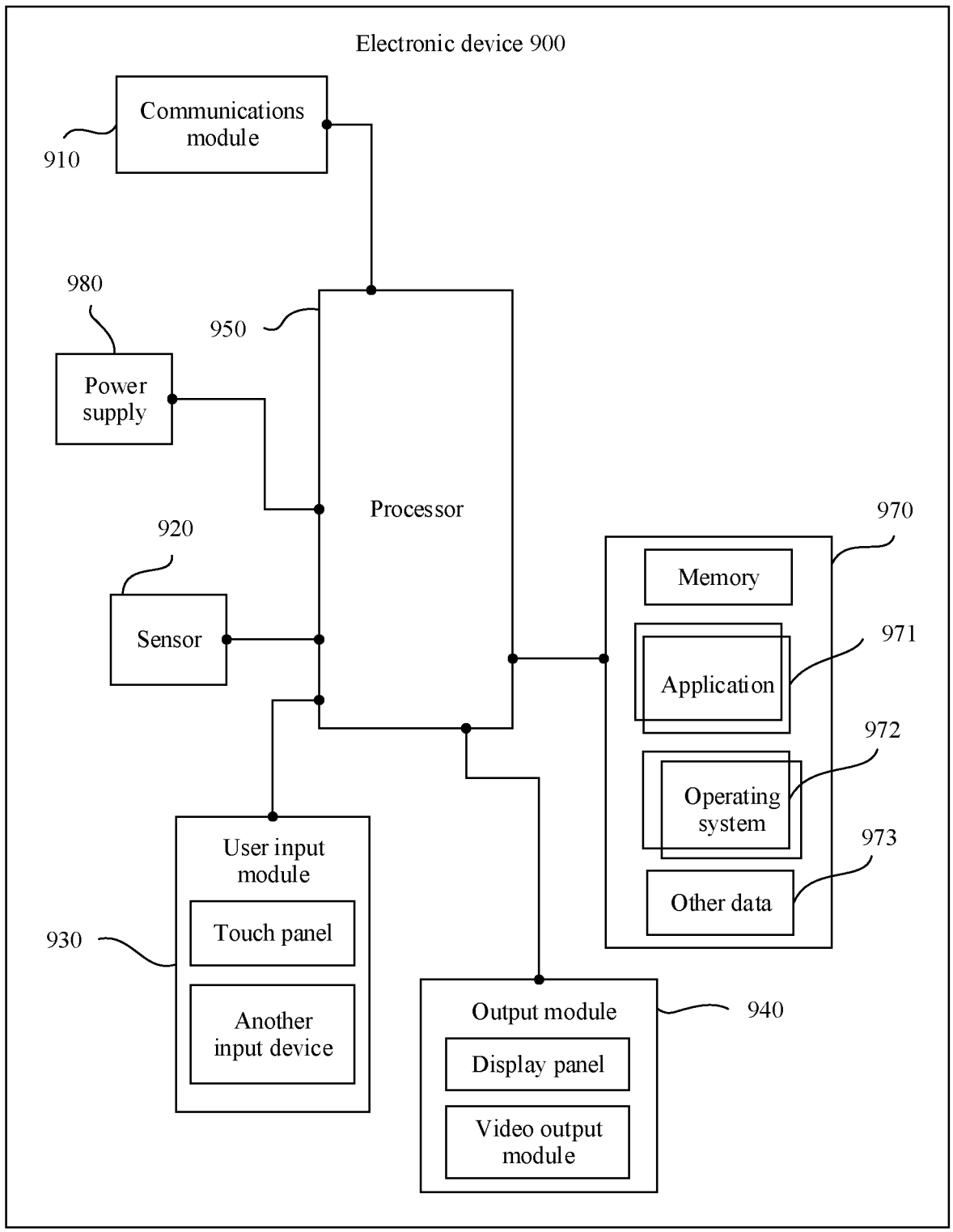
FIG. 11 is a diagram of an electronic device according to an embodiment of this application.

FIG. 11 is a diagram of an electronic device 900 according to an embodiment of this application. The electronic device 900 may be but is not limited to a laptop computer, a desktop computer, a mobile phone, a smartphone, a tablet computer, a multimedia player, an e-reader, a smart vehicle-mounted device, a smart household appliance, an artificial intelligence device, a wearable device, an internet of things device, a virtual reality device/an augmented reality device/a hybrid reality device, or the like.

It should be understood that a structure of the apparatus 700 shown in FIG. 9 may be shown in FIG. 11.

The electronic device 900 in FIG. 11 includes a communications module 910, a sensor 920, a user input module 930, an output module 940, a processor 950, a memory 970, and a power supply 980. The processor 950 may include one or more CPUs.

The electronic device shown in FIG. 11 may perform the steps of the graphics rendering method in the embodiments of this application. The one or more CPUs in the processor 950 may perform the steps of the graphics rendering method in the embodiments of this application.

The following describes each module of the electronic device 900 in FIG. 11 in detail. It should be understood that the modules shown in FIG. 11 are merely examples for description. In a specific implementation, the electronic device 900 may include more or fewer modules.

The communications module 910 may include at least one module that can enable the electronic device to communicate with another electronic device. For example, the communication module 910 may include one or more of a wired network interface, a broadcast receiving module, a mobile communications module, a wireless internet module, a local area communications module, and a location (or positioning) information module. This embodiment sets no limitation on a communications generation, for example, the communications generation may be 2G, 3G, 4G, 5G, or another communications generation that emerges with development of technologies.

For example, the communications module 910 can obtain, from a game server end in real time, a rendering instruction required for rendering a game picture.

The sensor 920 may sense some operations of a user, and the sensor 920 may include a distance sensor, a touch sensor, and the like. The sensor 920 may sense an operation such as touching a screen or approaching a screen by the user.

For example, the sensor 920 can sense some operations of the user on a game interface.

The user input module 930 is configured to: receive input digit information, character information, or a contact touch operation/contactless gesture; and receive signal input related to user setting and function control of a system. The user input module 930 includes a touch panel and/or another input device. For example, the user may control a game by using the user input module 930.

The output module 940 includes a display panel, configured to display information entered by the user, information provided for the user, various menu interfaces of the system, and the like.

Optionally, the display panel may be configured in a form of a liquid crystal display (liquid crystal display, LCD), an organic light-emitting diode (organic light-emitting diode, OLED), or the like. In some other embodiments, the touch panel may cover the display panel, to form a touch display screen.

In addition, the output module 940 may further include a video output module, an alarm, a tactile module, and the like. The video output module may display a game picture after graphics rendering is performed.

The power supply 980 may receive external power and internal power under control of the processor 950, and provide power required for running the modules in the electronic device.

The processor 950 may include one or more CPUs, and the processor 950 may further include one or more GPUs.

When the processor 950 includes a plurality of CPUs, the plurality of CPUs may be integrated into a same chip, or may be separately integrated into different chips.

When the processor 950 includes a plurality of GPUs, the plurality of GPUs may be integrated into a same chip, or may be separately integrated into different chips.

When the processor 950 includes both a CPU and a GPU, the CPU and the GPU may be integrated into a same chip.

For example, when the electronic device shown in FIG. 11 is a smartphone, a CPU and a GPU are usually related to image processing inside a processor of the smartphone. Both the CPU and the GPU herein may include a plurality of cores.

The memory 970 may store a computer program, and the computer program includes an operating system program 972, an application 971, and the like. For example, atypical operating system is a system, such as Windows of Microsoft or MacOS of Apple, used for a desktop computer or a notebook computer; or a system, such as a Linux®-based Android (Android®) system developed by Google, used for a mobile terminal.

The memory 970 may be one or more of the following types: a flash (flash) memory, a memory of a hard disk type, a memory of a micro multimedia card type, a card-type memory (for example, an SD or XD memory), a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 970 may be a network storage device on the internet. The system may perform an operation such as updating or reading on the memory 970 on the internet.

For example, the memory 970 may store a computer program (the computer program is a program corresponding to the graphics rendering method in the embodiments of this application). When the processor 950 executes the computer program, the processor 950 can perform the graphics rendering method in the embodiments of this application.

The memory 970 further stores other data 973 in addition to the computer program. For example, the memory 970 may store data in a processing process of the graphics rendering method in this application.

A connection relationship among the modules in FIG. 11 is only an example. The electronic device provided in any embodiment of this application may also be applied to an electronic device using another connection manner. For example, all modules are connected through a bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that the term "first", "second", "third", and the like in the embodiments of this application are merely intended to indicate objects, but do not indicate a sequence of corresponding objects.

It should be understood that, the term "and/or" in the embodiments of this application describes only an association relationship for describing associated objects and represents that three relationships may exist. For example, A and/or B may represent the following cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A graphics rendering method, comprising:
   starting, by a server, an application;
   obtaining, by the server, a rendering instruction sent by the application;
   determining, by the server, a rendering information set according to a preconfigured information list and the rendering instruction, the preconfigured information list comprises rendering information whose quantity of retransmission times is less than a predetermined threshold, the quantity of retransmission times comprising the number of retransmission times after a first transmission; and
   sending, by the server, the rendering instruction to an electronic device, the rendering instruction is used by the electronic device to perform graphics rendering and to display an image related to the application.

2. The method according to claim 1, wherein the method further comprises:
   storing graphics rendering information, the graphics rendering information is information required by the electronic device to perform graphics rendering.

3. The method according to claim 2, wherein the method further comprises:
   receiving a second instruction sent by the electronic device, the second instruction is used to request to restore a connection between the electronic device and a server; and
   sending the graphics rendering information to the electronic device in response to the second instruction, the graphics rendering information being used by the electronic device to restore a rendering context, and the rendering context being a rendering context of the application when the second instruction is received.

4. The method according to claim 2, wherein the graphics rendering information is the rendering instruction.

5. The method according to claim 2, wherein the graphics rendering information is the rendering information set obtained by processing the rendering instruction.

6. The method according to claim 5, wherein the method further comprises:
reordering rendering information in the rendering information set according to a rendering order, wherein the rendering order is an order of rendering information when a rendering pipeline of the electronic device runs graphics rendering; and
the sending the graphics rendering information to the electronic device comprises sending the reordered rendering information set to the electronic device.

7. The method according to claim 3, wherein the method further comprises:
receiving a cache list sent by the electronic device, wherein the cache list is a list of rendering information cached by the electronic device; and
the sending the graphics rendering information to the electronic device comprises sending some or all of the graphics rendering information to the electronic device according to the cache list, wherein the sent graphics rendering information is graphics rendering information that does not exist in the cache list.

8. The method according to claim 5, wherein the sending the graphics rendering information to the electronic device comprises:
determining an instruction sequence, wherein the instruction sequence is used by a graphics processing unit of the electronic device to identify the rendering information set; and
sending the instruction sequence and the rendering information set to the electronic device.

9. A graphics rendering method, comprising:
receiving, by an electronic device, a rendering instruction sent by a server;
receiving, by the electronic device, a rendering information set, the rendering information set determined according to a preconfigured information list and the rendering instruction, the preconfigured information list comprises rendering information whose quantity of retransmission times is less than a predetermined threshold, the quantity of retransmission times comprising the number of retransmission times after a first transmission; and
performing, by the electronic device, graphics rendering according to the rendering instruction and displaying an image related to an application.

10. The method according to claim 9, wherein the method further comprises:
sending a second instruction to the server, the second instruction is used to request to restore a connection between the electronic device and the server;
receiving graphics rendering information sent by the server; and
restoring a rendering context based on the graphics rendering information, the rendering context is a rendering context of the application when the second instruction is sent.

11. The method according to claim 10, wherein the graphics rendering information is the rendering instruction.

12. The method according to claim 10, wherein the graphics rendering information is a rendering information set obtained by processing the rendering instruction.

13. The method according to claim 12, wherein the method further comprises:
determining an instruction sequence, wherein the instruction sequence is used by a graphics processing unit of the electronic device to identify the rendering information set.

14. The method according to claim 12, wherein the rendering information set comprises first identification information and first rendering information, the first identification information is used by the server to identify the first rendering information, and the method further comprises:
determining a mapping relationship, the mapping relationship being a correspondence between the first identification information and second identification information, and the second identification information is used by the electronic device to identify the first rendering information.

15. A graphics rendering apparatus, comprising:
a memory storing instructions; and
a processor in communication with the memory, the processor executes the instructions to:
start an application;
obtain a rendering instruction sent by the application;
determine a rendering information set according to a preconfigured information list and the rendering instruction, the preconfigured information list comprises rendering information whose quantity of retransmission times is less than a predetermined threshold, the quantity of retransmission times comprising the number of retransmission times after a first transmission; and
send the rendering instruction to an electronic device, the rendering instruction is used by the electronic device to perform graphics rendering and to display an image related to the application.

16. The apparatus according to claim 15, wherein the processor or the memory is configured to store graphics rendering information, wherein the graphics rendering information is information required by the electronic device to perform graphics rendering.

17. A graphics rendering apparatus, comprising:
a memory storing instructions; and
a processor in communication with the memory, the processor executes the instructions to:
receive a rending instruction sent by a server, the rendering instruction is used by an electronic device to perform graphics rendering;
receive a rendering information set, the rendering information set determined according to a preconfigured information list and the rendering instruction, the preconfigured information list comprises rendering information whose quantity of retransmission times is less than a predetermined threshold, the quantity of retransmission times comprising the number of retransmission times after a first transmission; and
performing graphics rendering according to the rendering instruction and displaying an image related to an application.

18. The apparatus according to claim 17, wherein the processor further executes the instructions to:
send a second instruction to the server, wherein the second instruction requests restoring a connection between the electronic device and the server;
receive graphics rendering information sent by the server; and restore a rendering context based on the graphics rendering information, wherein the rendering context is a rendering context of the application when the second instruction is sent.

\* \* \* \* \*